United States Patent
Tang et al.

(10) Patent No.: US 12,411,609 B2
(45) Date of Patent: Sep. 9, 2025

(54) MEMORY DEVICE AND ITS OPERATING METHOD, MEMORY SYSTEM AND OPERATING METHOD THEREOF

(71) Applicant: YANGTZE MEMORY TECHNOLOGIES CO., LTD., Wuhan (CN)

(72) Inventors: Xingwei Tang, Wuhan (CN); Guangchang Ye, Wuhan (CN); Lu Guo, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 11 days.

(21) Appl. No.: 18/595,879

(22) Filed: Mar. 5, 2024

(65) Prior Publication Data
US 2025/0147667 A1    May 8, 2025

Related U.S. Application Data

(63) Continuation of application No. PCT/CN2023/130024, filed on Nov. 6, 2023.

(51) Int. Cl.
G06F 3/06 (2006.01)
(52) U.S. Cl.
CPC .......... G06F 3/0613 (2013.01); G06F 3/0659 (2013.01); G06F 3/0679 (2013.01)

(58) Field of Classification Search
CPC ..... G06F 3/0613; G06F 3/0659; G06F 3/0679
USPC ................................... 711/103, 102
See application file for complete search history.

(56) References Cited

U.S. PATENT DOCUMENTS

| | | | |
|---|---|---|---|
| 2024/0086074 A1* | 3/2024 | Song | G06F 3/0653 |
| 2024/0126452 A1* | 4/2024 | Lee | G06F 3/0619 |
| 2024/0231642 A1* | 7/2024 | Nicosia | G06F 3/0679 |
| 2024/0319886 A1* | 9/2024 | Zhang | G06F 3/0652 |

FOREIGN PATENT DOCUMENTS

| | | |
|---|---|---|
| CN | 113223593 A | 8/2021 |
| CN | 114333973 A | 4/2022 |
| CN | 115083489 A | 9/2022 |
| CN | 116153372 A | 5/2023 |

* cited by examiner

*Primary Examiner* — Hosain T Alam
*Assistant Examiner* — Zubair Ahmed
(74) *Attorney, Agent, or Firm* — BAYES PLLC

(57) ABSTRACT

According to one aspect of the present disclosure, a memory device is provided. The memory device may include an array of memory cells, including a plurality of memory cells. A preset number of memory cells form a code word. The memory device may include peripheral circuit coupled to the array of memory cells. The peripheral circuit may be configured to obtain the first result corresponding to the code word at the target read voltage. The peripheral circuit may be configured to adjust the target read voltage in accordance with the first result corresponding to the code words at the target read voltage. The peripheral circuit may be configured to obtain the first result corresponding to the code words at the adjusted read voltage. The peripheral circuit may be configured to determine a valley voltage in accordance with a plurality of the first results.

20 Claims, 18 Drawing Sheets

** MEMORY DEVICE AND ITS OPERATING METHOD, MEMORY SYSTEM AND OPERATING METHOD THEREOF

CROSS-REFERENCE TO RELATED APPLICATIONS

This application is a continuation of International Application No. PCT/CN2023/130024, filed on Nov. 6, 2023, the content of which is incorporated herein by reference in its entirety.

FIELD OF TECHNOLOGY

The present application relates but is not limited to a memory device and operating method thereof, a memory system and operating method thereof.

BACKGROUND

With the development of science and technology, the market size of the integrated circuit industry is getting larger and larger, and the process and technology for a non-volatile memory device in the entire integrated circuit industry have experienced rapid development in recent years. NAND memory is widely used. NAND memory implements a function of data storage through capturing and storing charges in the gate dielectric layers of the memory cells included in the NAND memory. However, with the use increasing over time, the charge stored in the memory cell may change due to the increase of the use time, repeated read operations, cross temperature, etc., therefore affecting the accuracy of reading data stored in the memory cell.

SUMMARY

According to one aspect of the present disclosure, a memory device is provided. The memory device may include an array of memory cells, including a plurality of memory cells. A preset number of the plurality of memory cells may form a code word. The memory device may include a peripheral circuit coupled to the array of memory cells. The peripheral circuit may be configured to obtain a first result corresponding to at least one of the code words at a target read voltage. The first result may include the number of bits which represents the number of bits in at least one of the code words which are flipped in two results of reading at a first read voltage and a second read voltage. A difference between the first read voltage and the second read voltage may be less than a preset voltage. The peripheral circuit may be configured to adjust the target read voltage in accordance with the first result corresponding to at least one of the code words at the target read voltage. The peripheral circuit may be configured to obtain a first result corresponding to at least one of the code words at the adjusted read voltage. The peripheral circuit may be configured to determine a valley voltage in accordance with a plurality of the first results. The valley voltage may be a read voltage for performing a read operation on at least one of the code words.

In some implementations, the peripheral circuit may be configured to read data stored in at least one of the code words at the target read voltage to obtain a second result. In some implementations, the peripheral circuit may be configured to perform a first adjustment to the target read voltage, and read data stored in at least one of the code words at the adjusted target read voltage to obtain a third result. In some implementations, the peripheral circuit may be configured to perform a logical operation on the second result and the third result to obtain a fourth result. In some implementations, the peripheral circuit may be configured to count the number of bits in the fourth result that represents flip of bits in the third result relative to the second result to obtain a first result.

In some implementations, the peripheral circuit may include a first latch configured to store the second result. In some implementations, the peripheral circuit may include a second latch configured to store the third result. In some implementations, the peripheral circuit may include a third latch configured to store the fourth result.

In some implementations, the peripheral circuit may be configured to, when the first result corresponding to the target read voltage is less than or equal to a first preset value, perform a second adjustment to the target read voltage to obtain a target adjusted read voltage. In some implementations, a step size of the second adjustment may be greater than a step size of the first adjustment. In some implementations, the peripheral circuit may be configured to obtain a first result corresponding to at least one of the code words at the target adjusted read voltage.

In some implementations, the peripheral circuit may be configured to, when the first result corresponding to at least one of the code words at the target adjusted read voltage is less than the first preset value and greater than a second preset value, continue to perform a second adjustment to the target adjusted read voltage, and obtain a first result corresponding to at least one of the code words at the adjusted read voltage, until a first result corresponding to a final adjusted read voltage is less than or equal to the second preset value.

In some implementations, the peripheral circuit may be configured to, when the first result corresponding to the final adjusted read voltage is less than or equal to the second preset value, take the read voltage corresponding to the first result with the smallest count number among the first results as the valley voltage.

In some implementations, the peripheral circuit may be configured to, when the first result corresponding to the target read voltage is greater than a first preset value, perform multiple adjustments to the target read voltage, and obtain a plurality of first results respectively corresponding to at least one of the code words at the read voltages after multiple adjustments. In some implementations, the peripheral circuit may be configured to, when the plurality of first results are all greater than the first preset value, adjust the number of memory cells corresponding to at least one of the code words. The number of memory cells corresponding to the code word after adjustment may be less than the number of memory cells corresponding to the code word before adjustment.

In some implementations, the peripheral circuit may be configured to obtain the first preset value. In some implementations, the first preset value may be equal to an upper limit of fail bit count supported by the memory device.

In some implementations, the peripheral circuit may be configured to set a read mode of the memory device to a single level read mode before obtaining the first result corresponding to at least one of the code words at the target read voltage. In some implementations, the single level read mode may include reading at least one bit of storage data stored in the memory cell with read voltages at one level.

In some implementations, the memory cell may include M bits, the memory device may include M-type pages, and the memory cell with M bits may read its M bits of storage data with read voltages at N levels. In some implementations, the M and N both may be integers greater than 1, and $N=2^M-1$. In some implementations, the peripheral circuit may be configured to, for read voltages at each level of the read voltages at multiple levels corresponding to each type of page, determine the valley voltage at each level in accordance with a plurality of first results corresponding to multiple read voltages at each level.

According to another aspect of the present disclosure, a memory system is provided. The memory system may include one or more memory devices. The memory system may include an array of memory cells, including a plurality of memory cells. A preset number of the plurality memory cells may form a code word. The memory system may include a peripheral circuit coupled to the array of memory cells. The peripheral circuit may be configured to obtain a first result corresponding to at least one of the code words at a target read voltage. The first result includes the number of bits which represents the number of bits in at least one of the code words which are flipped in two results of reading at a first read voltage and a second read voltage. A difference between the first read voltage and the second read voltage may be less than a preset voltage. The peripheral circuit may be configured to adjust the target read voltage in accordance with the first result corresponding to at least one of the code words at the target read voltage. The peripheral circuit may be configured to obtain a first result corresponding to at least one of the code words at the adjusted read voltage. The peripheral circuit may be configured to determine a valley voltage in accordance with a plurality of the first results. The valley voltage may be a read voltage for performing a read operation on at least one of the code words. The memory system may include a memory controller coupled to the memory device and controlling the memory device.

In some implementations, the memory controller may be configured to send a first instruction before performing a read operation on data stored in the memory device. In some implementations, the first instruction may indicate to obtain the valley voltage. In some implementations, the memory device may be configured to receive the first instruction. In some implementations, the memory device may be configured to obtain the valley voltage. In some implementations, the memory device may be configured to send the obtained valley voltage to the memory controller. In some implementations, the memory controller may be further configured to perform a read operation on data stored in the memory device in accordance with the valley voltage. In some implementations, the memory controller may be further configured to perform an error correction code decoding operation on a read result of the read operation.

According to still another aspect of the present disclosure, a memory system is provided. The memory system may include at least one memory device including a plurality of memory cells. A preset number of the plurality memory cells may form a code word. The memory system may include a memory controller coupled to the at least one memory device. The memory controller may be configured to obtain a first result corresponding to at least one of the code words at a target read voltage. The first result includes the number of bits which represents the number of bits in at least one of the code words which are flipped in two results of reading at a first read voltage and a second read voltage. A difference between the first read voltage and the second read voltage may be less than a preset voltage. The memory controller may be configured to adjust the target read voltage in accordance with the first result corresponding to at least one of the code words at the target read voltage. The memory controller may be configured to obtain a first result corresponding to at least one of the code words at the adjusted read voltage. The memory controller may be configured to determine a valley voltage in accordance with a plurality of the first results. The valley voltage may be a read voltage for performing a read operation on at least one of the code words.

In some implementations, the memory controller may be configured to send a second instruction before performing a read operation on data stored in the memory device. In some implementations, the second instruction may indicate to obtain a plurality of first results corresponding to at least one of the code words at multiple different read voltages. In some implementations, the memory device may be configured to receive the second instruction. In some implementations, the memory device may be configured to obtain a plurality of first results corresponding to at least one of the code words at multiple different read voltages. In some implementations, the memory device may be configured to send the obtained first results to the memory controller. In some implementations, the memory controller may be further configured to determine a valley voltage in accordance with the plurality of first results respectively corresponding to multiple different read voltages. In some implementations, the memory controller may be further configured to perform a read operation on data stored in the memory device in accordance with the valley voltage.

In some implementations, the memory device may be configured to read data stored in at least one of the code words at the target read voltage to obtain a second result. In some implementations, the memory device may be configured to perform a first adjustment to the target read voltage and read data stored in at least one of the code words at the target read voltage to obtain a third result. In some implementations, the memory device may be configured to perform a logical operation on the second result and the third result to obtain a fourth result. In some implementations, the memory device may be configured to count the number of bits in the fourth result that represent flip of bits in the third result relative to the second result to obtain a first result.

In some implementations, the data amount of the first result may be less than a preset threshold of data amount.

According to still a further aspect of the present disclosure, a method for operating a memory device is provided. The method may include obtaining a first result corresponding to at least one of code words at a target read voltage. The first result may include a number of bits which represents the number of bits in at least one of the code words which are flipped in two results of reading at a first read voltage and a second read voltage. A difference between the first read voltage and the second read voltage may be less than a preset voltage. The memory device may include an array of memory cells. The array of memory cells may include a plurality of memory cells. A preset number of the plurality memory cells may form a code word. The method may include adjusting the target read voltage in accordance with the first result corresponding to at least one of the code words at the target read voltage. The method may include obtaining a first result corresponding to at least one of the code words at the adjusted read voltage. The method may include determining a valley voltage in accordance with a plurality of the first results. The valley voltage may be a read voltage for performing a read operation on at least one of the code words.

In some implementations, the obtaining the first result corresponding to at least one of code words at the target read voltage may include reading data stored in at least one of the code words at the target read voltage to obtain a second result. In some implementations, the obtaining the first result corresponding to at least one of code words at the target read voltage may include performing a first adjustment to the target read voltage, and reading data stored in at least one of the code words at the adjusted target read voltage to obtain a third result. In some implementations, the obtaining the first result corresponding to at least one of code words at the target read voltage may include performing a logical operation on the second result and the third result to obtain a fourth result. In some implementations, the obtaining the first result corresponding to at least one of code words at the target read voltage may include counting the number of bits in the fourth result that represent flip of bits in the third result relative to the second result to obtain a first result.

In some implementations, the method may include storing the second result in a first latch of the memory device. In some implementations, the method may include storing the third result in a second latch of the memory device. In some implementations, the method may include storing the fourth result in a third latch of the memory device.

In some implementations, the adjusting the target read voltage in accordance with the first result corresponding to at least one of the code words at the target read voltage may include performing a second adjustment to the target read voltage to obtain a target adjusted read voltage when the first result corresponding to the target read voltage is less than or equal to a first preset value. In some implementations, a step size of the second adjustment may be greater than a step size of the first adjustment. In some implementations, the adjusting the target read voltage in accordance with the first result corresponding to at least one of the code words at the target read voltage may include obtaining a first result corresponding to at least one of the code words at the target adjusted read voltage.

In some implementations, the method may include, when the first result corresponding to at least one of the code words at the target adjusted read voltage is less than the first preset value and greater than a second preset value, continuing to perform a second adjustment to the target adjusted read voltage, and obtaining a first result corresponding to at least one of the code words at the adjusted read voltage, until a first result corresponding to a final adjusted read voltage is less than or equal to the second preset value.

In some implementations, the determining the valley voltage in accordance with the plurality of the first results may include, when the first result corresponding to the final adjusted read voltage is less than or equal to the second preset value, taking the read voltage corresponding to the smallest first result among the first results as the valley voltage.

In some implementations, the method may include, when the first result corresponding to the target read voltage is greater than a first preset value, performing multiple adjustments to the target read voltage, and obtaining a plurality of first results respectively corresponding to at least one of the code words at the read voltages after multiple adjustments. In some implementations, the method may include, when the plurality of first results are all greater than the first preset value, adjusting the number of memory cells corresponding to at least one of the code words. In some implementations, the number of memory cells corresponding to the code word after adjustment may be less than the number of memory cells corresponding to the code word before adjustment.

In some implementations, the method may include obtaining the first preset value. In some implementations, the first preset value may be equal to an upper limit of fail bit count supported by the memory device.

In some implementations, the method may include setting a read mode of the memory device to a single level read mode before obtaining the first result corresponding to at least one of the code words at the target read voltage. In some implementations, the single level read mode may include reading at least one bit of storage data stored in the memory cell with read voltages at one level.

In some implementations, the memory cell may include M bits, the memory device may include M-type pages, and the memory cell with M bits reads its M bits of storage data with read voltages at N levels. In some implementations, the M and N both may be integers greater than 1, and $N=2^M-1$. In some implementations, the method may include, for read voltages at each level of the read voltages at multiple levels corresponding to each type of page, determining the valley voltage at each level in accordance with a plurality of first results corresponding to multiple read voltages at each level.

According to yet another aspect of the present disclosure, a method for operating a memory system is provided. The method may include sending a first instruction before performing a read operation on data stored in a memory device of the memory system. The first instruction may indicate to obtain a valley voltage which is obtained according to a method of obtaining the valley voltage. The method of obtaining the valley voltage may include obtaining a first result corresponding to at least one of code words at a target read voltage. The first result may include a number of bits which represents the number of bits in at least one of the code words which are flipped in two results of reading at a first read voltage and a second read voltage. A difference between the first read voltage and the second read voltage ay be less than a preset voltage. The memory device may include an array of memory cells, the array of memory cells includes a plurality of memory cells, and a preset number of the plurality memory cells form a code word. The method of obtaining the valley voltage may include adjusting the target read voltage in accordance with the first result corresponding to at least one of the code words at the target read voltage. The method of obtaining the valley voltage may include obtaining a first result corresponding to at least one of the code words at the adjusted read voltage. The method of obtaining the valley voltage may include determining a valley voltage in accordance with a plurality of the first results. The valley voltage may to be a read voltage for performing a read operation on at least one of the code words. The method may include performing a read operation on data stored in the memory device in accordance with the valley voltage. The method may include performing an error correction code decoding operation on a read result of the read operation.

According to yet a further aspect of the present disclosure, a method for operating a memory system is provided. The method may include obtaining a first result corresponding to a code word at a target read voltage. The first result may include a number of bits which represents the number of bits in at least one of the code words which are flipped in two results of reading at a first read voltage and a second read voltage. A difference between the first read voltage and the second read voltage may be less than a preset voltage. The memory system may include at least one memory device, the memory device includes a plurality of memory cells, a preset number of the plurality memory cells form a code word. The method may include adjusting the target read voltage in accordance with the first result corresponding to at least one of the code words at the target read voltage. The method may include obtaining a first result corresponding to at least one of the code words at the adjusted read voltage. The method may include determining a valley voltage in accordance with a plurality of the first results. The valley voltage is a read voltage for performing a read operation on at least one of the code words.

In some implementations, the method may include sending a second instruction before performing a read operation on data stored in the memory device of the memory system. In some implementations, the second instruction may indicate to obtain first results corresponding to at least one of the code words at different read voltages. In some implementations, the method may include determining a valley voltage in accordance with a plurality of the first results respectively corresponding to multiple different read voltages. In some implementations, the method may include performing a read operation on data stored in the memory device in accordance with the valley voltage.

In some implementations, the method may include reading data stored in at least one of the code words at the target read voltage to obtain a second result. In some implementations, the method may include performing a first adjustment to the target read voltage and reading data stored in at least one of the code words at the adjusted target read voltage to obtain a third result. In some implementations, the method may include performing a logical operation on the second result and the third result to obtain a fourth result. In some implementations, the method may include counting the number of bits in the fourth result that represent flip of bits in the third result relative to the second result to obtain a first result.

According to another aspect of the present disclosure, a memory device is provided. The memory device may include an array of memory cells, including a plurality of memory cells. A preset number of the plurality memory cells may form a code word. The memory device may include a peripheral circuit coupled to the array of memory cells. The peripheral circuit may include a page buffer. The peripheral circuit may include control logic. The control logic may be configured to read data stored in at least one of the code words at a first read voltage to obtain a second result, and store the second result in a first latch of the page buffer. The control logic may be configured to adjust the first read voltage to obtain a second read voltage, read data stored in at least one of the code words at the second read voltage to obtain a third result, and store the third result in a second latch of the page buffer. A difference between the first read voltage and the second read voltage may be less than a preset voltage. The control logic may be configured to perform a logical operation on the second result and the third result to obtain a fourth result, and store the fourth result in a third latch of the page buffer. The control logic may be configured to count the number of bits in the fourth result that represent flip of bits in the third result relative to the second result to obtain a first result.

According to a further aspect of the present disclosure, a method for operating a memory device is provided. The method may include reading data stored in a code word at a first read voltage to obtain a second result, and storing the second result in a first latch of a page buffer. The memory device may include an array of memory cells and a page buffer, the array of memory cells includes a plurality of memory cells, and a preset number of the plurality memory cells form a code word. The method may include adjusting the first read voltage to obtain a second read voltage, reading data stored in at least one of the code words at the second read voltage to obtain a third result, and storing the third result in a second latch of the page buffer. A difference between the first read voltage and the second read voltage may be less than a preset voltage. The method may include performing a logical operation on the second result and the third result to obtain a fourth result, and storing the fourth result in a third latch of the page buffer. The method may include counting the number of bits in the fourth result that represent flip of bits in the third result relative to the second result to obtain a first result.

BRIEF DESCRIPTION OF THE DRAWINGS

In the accompanying drawings, unless otherwise specified, same reference numbers refer to same or similar parts or elements throughout multiple accompanying drawings. The accompanying drawings are not necessarily to scale. It should be understood that these accompanying drawings depict only some examples disclosed in accordance with the present application and should not be considered as limiting the scope of the present application.

DETAILED DESCRIPTION

Figure 1:
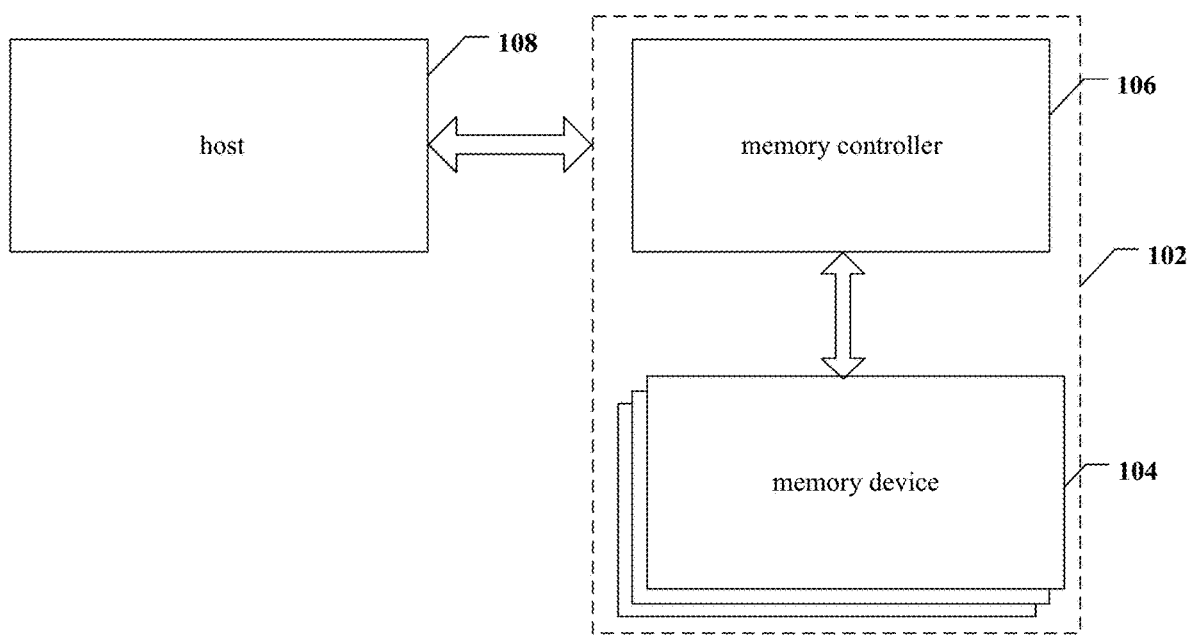
FIG. 1 is a schematic diagram of an example system including a memory system of an example according to the present application.

Example implementations disclosed in the present application will be described in more detail below with reference to the accompanying drawings. Although example implementations of the present application are shown in the accompanying drawings, it should be understood that the present application may be implemented in various forms and should not be limited to the specific implementations set forth herein. Rather, these examples are provided so that the present application can be more thoroughly understood and the scope of the present application can be fully conveyed to those skilled in the art.

In the following description, numerous specific details are given in order to provide a more thorough understanding of the present application. However, it will be apparent to one skilled in the art that the present application may be practiced without one or more of these details. In other examples, in order to avoid confusion with the present application, some technical features known in the art are not described; that is, not all features of the actual example are described here, and well-known functions and structures are not described in detail.

Furthermore, accompanying drawings are merely schematic illustrations of the present application and are not necessarily drawn to scale. Same reference numerals in the accompanying drawings represent same or similar parts, and thus repeated description thereof will be omitted. Some of the block diagrams shown in the accompanying drawings are functional entities and do not necessarily correspond to physically or logically separate entities. These functional entities may be implemented in software form, or implemented in one or more hardware modules or integrated circuits, or implemented in different networks and/or processor devices and/or microcontroller devices.

The flowcharts shown in the accompanying drawings are illustrative only and do not necessarily include all operations. For example, some operations may be decomposed, and some operations may be merged or partially merged, thus the actual order of execution may change according to the actual situation.

A term used herein is for the purpose of describing a particular example only and is not to be considered as limitation of the present application. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, operations, operations, elements and/or parts, but do not exclude the presence of one or more other features, integers, operations, operations, elements, parts and/or groups. As used herein, the term "and/or" includes any and all combinations of the associated listed items.

Memory devices in examples of the present application include but are not limited to a three-dimensional NAND memory, and for ease of understanding, a three-dimensional NAND memory is used as an example for illustration.

FIG. 1 illustrates a block diagram of an example system 100 with memory devices in accordance with some aspects of the present application. The system 100 may be a mobile phone, a desktop computer, a laptop computer, a tablet, a vehicle computer, a gaming console, a printer, a positioning device, a wearable electronic device, a smart sensor, a Virtual-Reality (VR) device, an Augment-Reality (AR) device, or any other suitable electronic devices having memory device therein. As shown in in FIG. 1, system 100 may include a host 108 and a memory system 102, and the memory system 102 has one or more memory devices 104 and a memory controller 106. The host 108 may be a processor of an electronic device (e.g., a Central Processing Unit (CPU)) or a System of Chip (SoC) (e.g., an Application Processor (AP)). Host 108 may be configured to send data to or receive data from memory device 104.

According to some implementations, memory controller 106 is coupled to memory device 104 and host 108 and is configured to control memory device 104. Memory controller 106 may manage data stored in memory device 104 and communicate with host 108. In some implementations, the memory controller 106 is designed to operate in low duty-cycle environments, e.g., Secure-Digital (SD) card, Compact-Flash (CF) card, Universal Serial Bus (USB) flash drive, or other media for use in electronic devices such as personal computer, digital camera, mobile phone, etc.

In some implementations, the memory controller 106 is designed to operate in high duty cycle environment Solid State Drive (SSD) or Embedded Multi Media Card (eMMC), where SSD or eMMC is used as data storage for mobile devices such as smartphone, tablet computer, laptop computer, and enterprise storage array.

Memory controller 106 may be configured to control operations of memory device 104, e.g., read, erase and program operations. Memory controller 106 may also be configured to manage various functions related to data stored or to be stored in memory device 104, including but not limited to bad-block management, garbage collection, logical-to-physical address translation, wear leveling, etc. In some implementations, memory controller 106 is also configured to process error-correction code related to data read from or written to memory device 104.

The memory controller 106 may also perform any other suitable functions, e.g., formatting the memory device 104. Memory controller 106 may communicate with external devices (e.g., host 108) according to a particular communication protocol. For example, the memory controller 106 may communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 106 and one or more memory device 104 may be integrated into various types of storage devices, e.g., included in the same package (e.g., Universal Flash Storage (UFS) package or eMMC package). That is, memory system 102 may be implemented and packaged into different types of end electronic products.

Figure 2A:
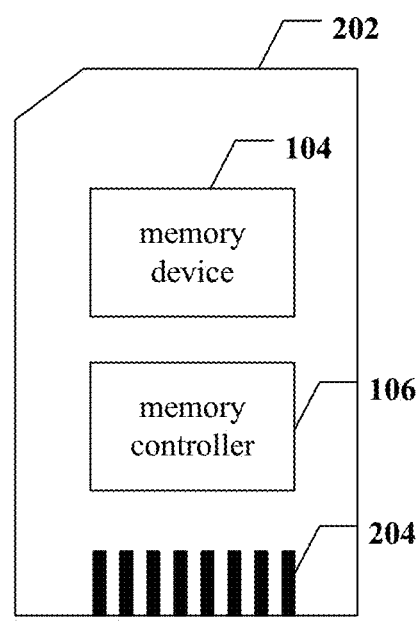
FIG. 2a is a schematic diagram of an example memory card including a memory system according to an example of the present application.

In one example as shown in FIG. 2a, memory controller 106 and a single memory device 104 may be integrated into a memory card 202. Memory card 202 may include a PC card (personal computer memory card international association (PCMCIA)), a CF card, a smart media (SM) card, a memory stick, a multimedia card (MMC) (reduced size (RS)-MMC, MMCmicro), an SD card (SD, miniSD, microSD, SD high capacity (SDHC)), a UFS, etc. Memory card 202 may further include a memory card connector 24 coupling memory card 202 with a host (e.g., host 108 in FIG. 1).

Figure 2B:
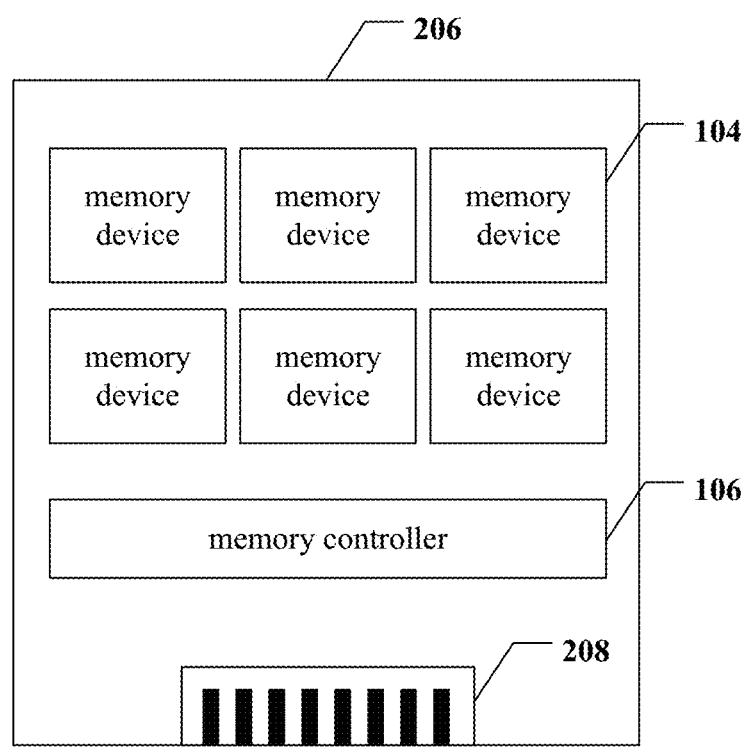
FIG. 2b is a schematic diagram of an example solid state drive including a memory system according to an example of the present application.

In another example as shown in FIG. 2b, memory controller 106 and multiple memory devices 104 may be integrated into a SSD 206. SSD 206 may further include an SSD connector 208 coupling the SSD 206 with a host (e.g., host 108 in FIG. 1). In some implementations, at least one of the storage capacity or operating speed of SSD 206 is greater than at least one of the storage capacity or operating speed of memory card 202.

Figure 3A:
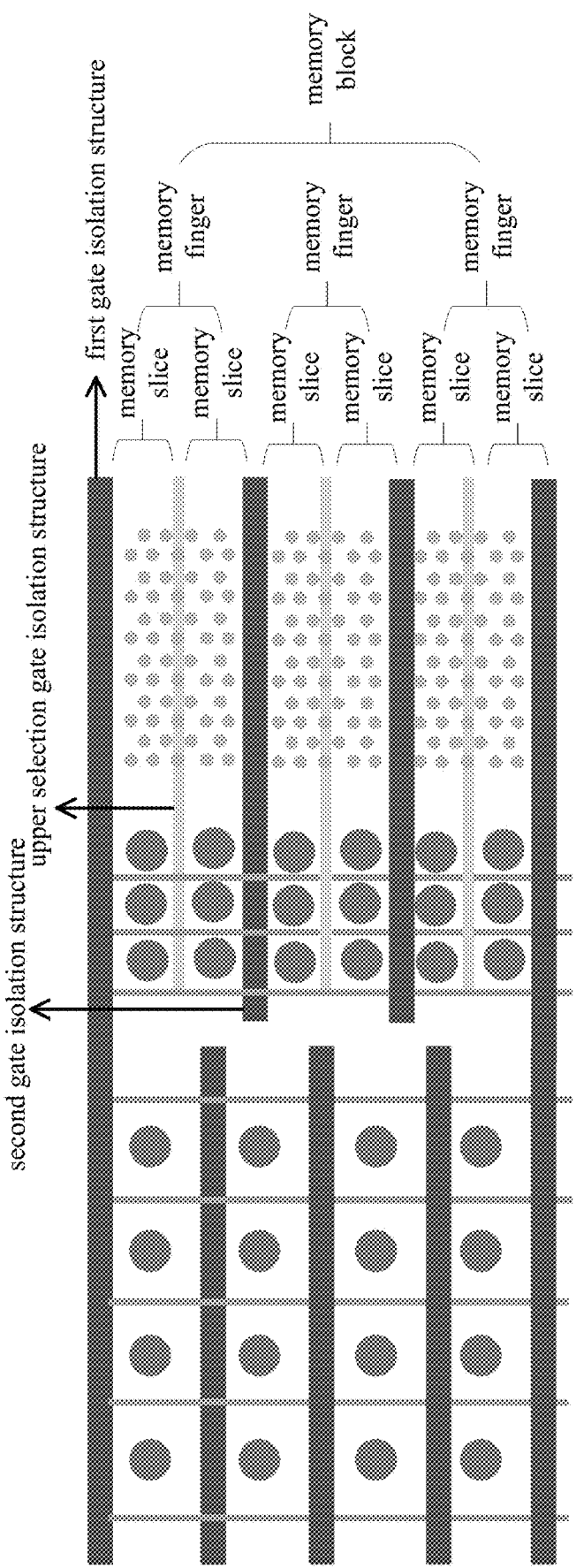
FIG. 3a is a schematic diagram of the distribution of memory cells of a three-dimensional NAND memory according to an example of the present application.

In one example, FIG. 3a provides a schematic structure diagram of an array of memory cells of a three-dimensional NAND memory, and as shown in FIG. 3a, the array of memory cells of the three-dimensional NAND memory is composed of several rows of memory cell rows parallel to the gate isolation structure and staggered in parallel. Every two memory cell rows are separated by a gate isolation structure and an upper selection gate isolation structure, and each memory cell row includes a plurality of memory cells. The gate isolation structure may include a first gate isolation structure and a second gate isolation structure. The first gate isolation structure divides the array of memory cells into multiple blocks, and multiple second gate isolation structures divide a block into multiple memory fingers. An upper selection gate isolation structure provided in the middle of each memory finger may divide the memory finger into two parts, thereby dividing the memory finger into two memory slices. A memory block shown in FIG. 3a includes 6 memory slices, and in practical applications, the number of memory slices in a memory block is not limited to this.

In some examples, multiple word lines may be coupled to each block. A plurality of memory cells coupled to each individually controlled word line may form a page, e.g., all memory cells in each memory slice in FIG. 3a are coupled to form a page.

It should be noted that the number of memory cell rows between the gate isolation structure and the upper selection gate isolation structure shown in FIG. 3a is provided by way of example and not limitation, and is not used to limit the number of memory cell rows included in a memory finger of the three-dimensional NAND memory in the present application. In practical applications, the number of memory cell rows included in a memory finger may be adjusted according to actual conditions, such as 2, 4, 8, 16, etc.

Figure 3B:
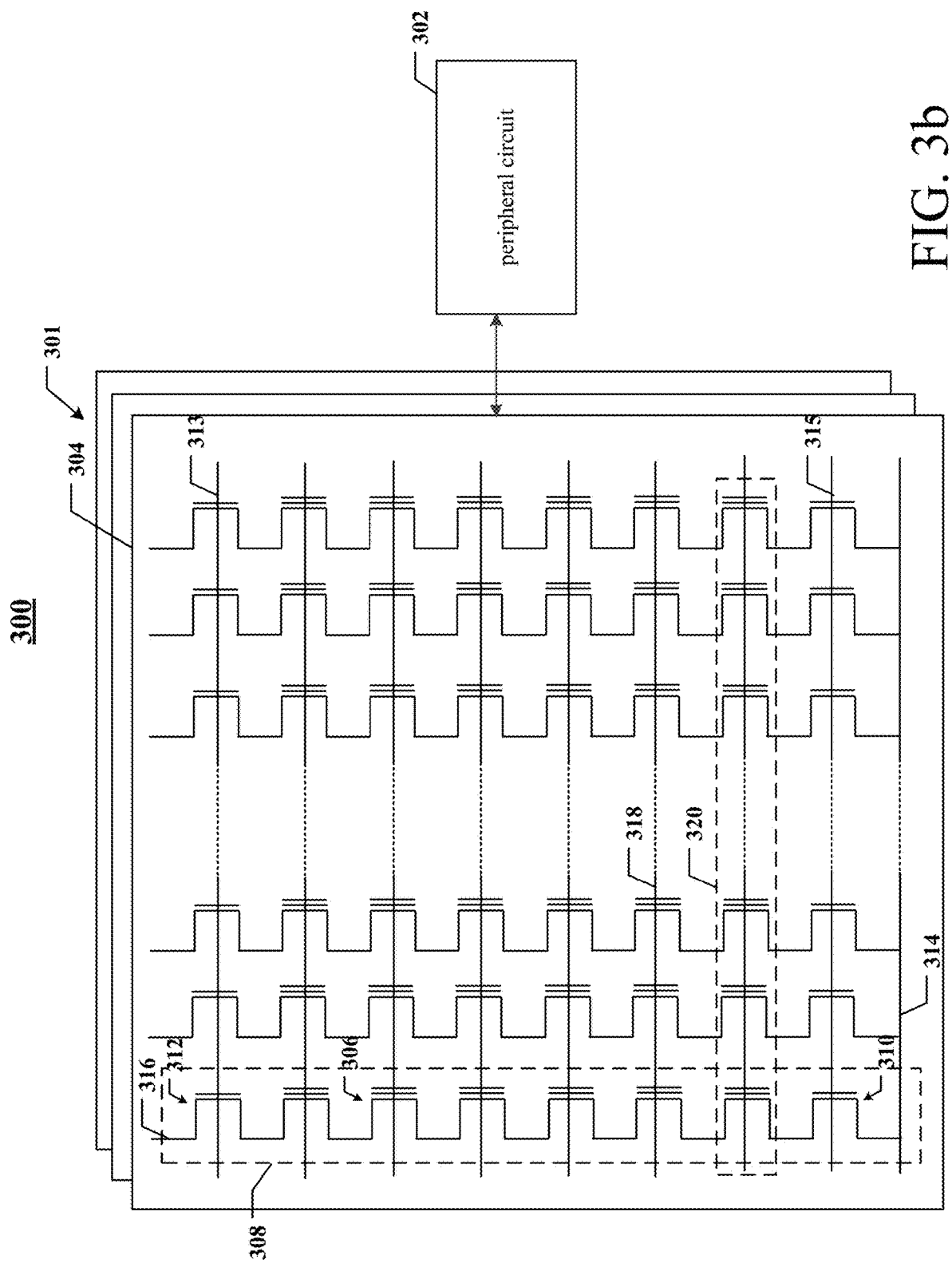
FIG. 3b is a schematic diagram of an example memory including peripheral circuits according to an example of the present application.

FIG. 3b illustrates a schematic circuit diagram of an example memory device 300 including peripheral circuitry according to some aspects of the present application. Memory device 300 may be an example of memory device 104 in FIG. 1. The memory device 300 may include an array of memory cells 301 and a peripheral circuit 302 coupled to the array of memory cells 301. Taking array of memory cells 301 being a three-dimensional NAND memory cell array as an example for illustration, where memory cells 306 is a NAND-type memory cell, and memory cells 306 are provided in the form of an array of memory strings 308, each memory string 308 extending vertically over a substrate (not shown). In some implementations, each memory string 308 includes a plurality of memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

In some implementations, each memory cell 306 is a Single-level Cell (SLC) that has two possible storage states and may thus store one bit of data. For example, a first storage state of "O" may correspond to a first voltage range, and a second storage state of "1" may correspond to a second voltage range. In some implementations, each memory cell 306 is a Multi-Level Cell (MLC) capable of storing more than a single bit of data in more than four storage states. For example, an MLC may store two bits per cell (also known as a Double-Level Cell), three bits per cell (also known as a Trinary-Level Cell (TLC)), four bits per cell (also known as a Quad-Level Cell (QLC)), five bits per cell (also known as a Penta-level cell (PLC)), or more than five bits per cell. Each MLC can be programmed to assume a range of possible nominal storage values. In one example, if each MLC stores two bits of data, the MLC can be programmed to assume one of three possible programming levels from the erased state through writing one of three possible nominal storage values into the cell. A fourth nominal storage value may be used for the erase state.

It should be noted that the storage state mentioned here is also the storage state of the memory cell mentioned in this application. Different memory cells have different numbers of storage states. For example, an SLC type memory cell has 2 storage states (e.g., two memory states), where the 2 storage states include a programming state and an erase state. As another example, an MLC type memory cell has 4 storage states, where the four storage states include one erase state and three programming states. As yet another example, a TLC type memory cell has 8 storage states, where the 8 storage states include one erase state and seven programming states. In some implementations, the QLC type memory cell has 16 storage states, where the 16 storage states include one erase state and fifteen programming states.

As shown in FIG. 3b, each memory string 308 may include a bottom select gate (BSG) 310 (also referred to as a source side select gate) at its source terminal and a top select gate (TSG) 312 (also referred to as a drain side select gate) at its drain terminal. BSG 310 and TSG 312 may be configured to activate the selected memory cell string 308 during read operation and program operation. In some implementations, the sources of memory strings 308 in a same memory block 304 are coupled through a same source line (SL) 314 (e.g., a common SL). In other words, according to some implementations, all memory strings 308 in a same memory block 304 have an array common source (ACS). According to some implementations, TSG 312 of each memory string 308 is coupled to a corresponding bit line (BL) 316 from which data may be read or written via an output bus (not shown). In some implementations, each memory string 308 is configured to be selected or deselected through at least one of applying a select voltage (e.g., above the threshold voltage of a transistor with a TSG 312) or a deselect voltage (e.g., 0V) to the corresponding TSG 312 via one or more TSG lines 313 or applying a select voltage (e.g., above the threshold voltage of a transistor with a BSG 310) or a deselect voltage (e.g., 0V) to the corresponding BSG 310 via one or more BSG lines 315.

As also shown in FIG. 3b, a memory string 308 may be organized into multiple memory blocks 304, each of which may have a common source line 314 (e.g., coupled to ground). In some implementations, each memory block 304 is the basic data unit for an erase operation, e.g., all memory cells 306 on the same memory block 304 are erased simultaneously. To erase the memory cell 306 in the selected memory block 304, the source line 314 coupled to the selected memory block 304 and to the unselected memory blocks 304 in the same plane as the selected memory block 304 may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of memory blocks. The memory cells 306 of adjacent memory strings 308 may be coupled through a word line 318 that selects which row of memory cells 306 is affected by read and program operations. In some implementations, combined with the above FIG. 3a, a plurality of memory cells are isolated by an upper selection gate isolation structure and a gate isolation structure; a plurality of memory cells between the upper selection gate isolation structure and the gate isolation structure are arranged into multiple memory cell rows; and each memory cell row is parallel to the gate isolation structure and the upper selection gate isolation structure. The memory cells in the memory slice that share a same word line form a physical page 320, each physical page 320 may be mapped to at least one logical page according to the storage mode of the corresponding memory cell 306 (e.g., SLC or MLC as mentioned above); a logical page may form the basic data unit for program operation and read operation.

Referring to FIGS. 3a and 3b, each memory cell 306 of the plurality of memory cells is coupled to a corresponding word line 318, and each memory string 308 is coupled to a corresponding bit line 316 through a corresponding select transistor (e.g., top select transistor (TSG) 312).

Figure 4:
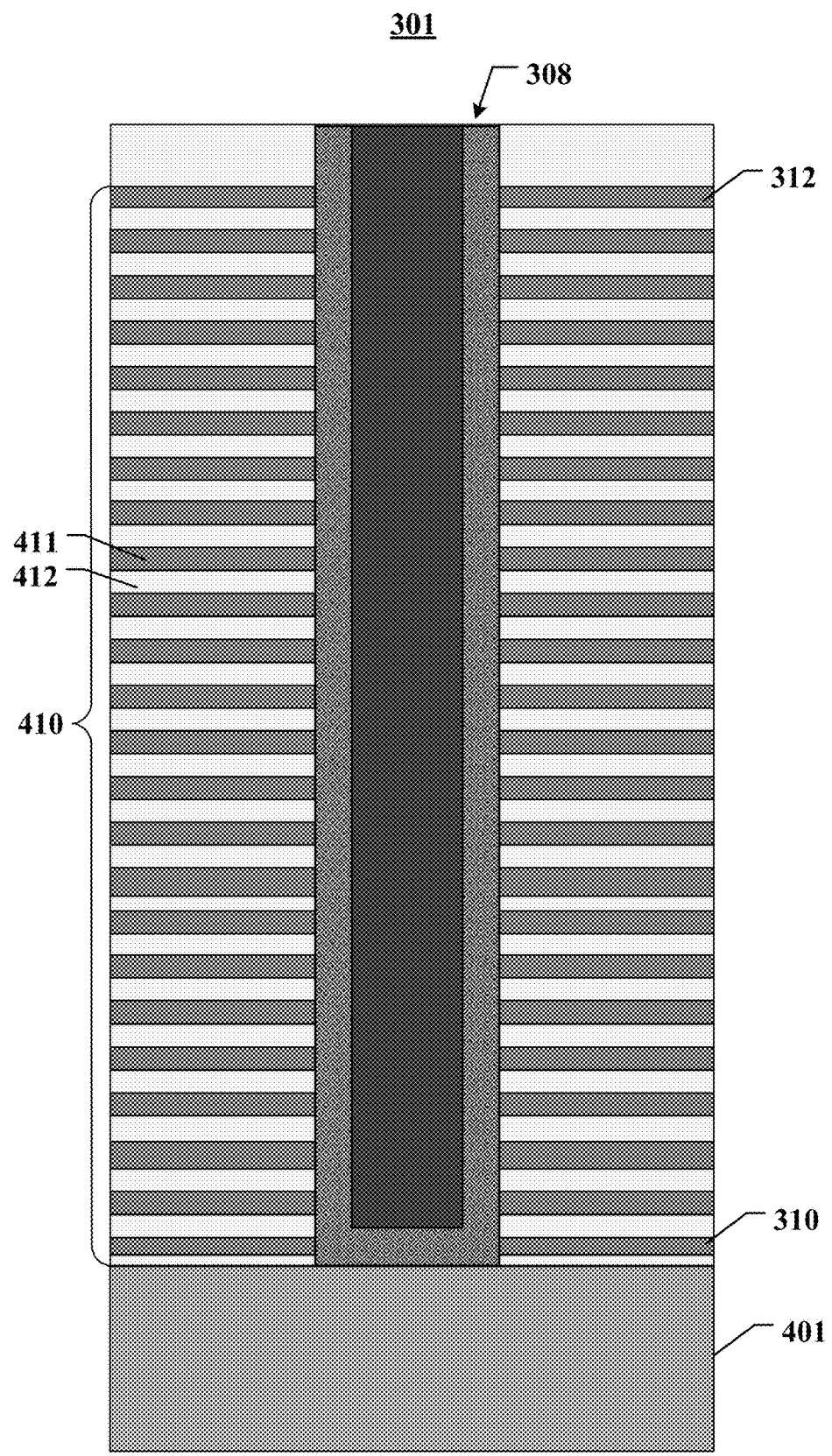
FIG. 4 is a schematic cross-sectional view of an array of memory cells including NAND-type memory strings according to an example of the present application.

FIG. 4 illustrates a schematic cross-sectional view of an array of memory cells 301 (e.g., a NAND memory cell array) including memory strings 308, according to some aspects of the present application. As shown in FIG. 4, the array of memory cells 301 may include a stacked structure 410; the stacked structure 410 includes multiple gate layers 411 and multiple insulating layers 412 alternately stacked in sequence; and the channel structure vertically penetrating through the gate layers 411 and the insulating layers 412. The channel structure may be coupled to each gate layer to form a memory cell, and the channel structure is coupled to multiple gate layers in the stacked structure 410 to form the memory string 308. Gate layers 411 and the insulating layers 412 may be stacked alternately, and two adjacent gate layers 411 are separated by an insulating layer 412.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as an upper selection gate line, a gate layer 411 at the bottom of a stacked structure 410 may extend laterally as a lower selection gate line, and a gate layer 411 extending laterally between an upper selection gate line and a lower selection gate line may serve as a word line layer.

In some examples, a stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with semiconductor material(s) (e.g., as a semiconductor channel) and dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer, and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon oxynitride/silicon oxide (ONO).

Figure 5:
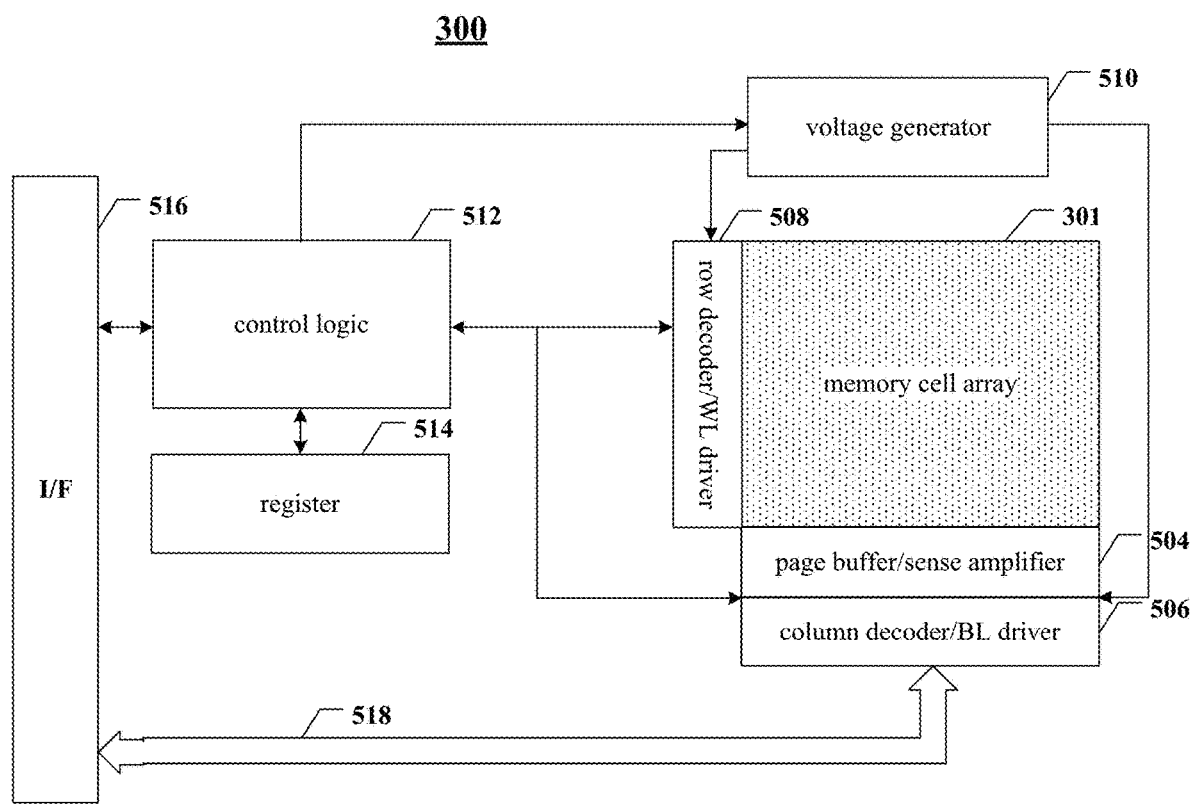
FIG. 5 is a schematic diagram of an example memory device including an array of memory cells and peripheral circuits according to an example of the present application.

Referring back to FIG. 3b, the peripheral circuit 302 may be coupled to the array of memory cells 301 through bit line 316, word line 318, source line 314, BSG line 315, and TSG line 313. The peripheral circuit 302 may include any suitable analog, digital, and mixed-signal circuitry for facilitating operation of the array of memory cells 301 through applying at least one of a voltage signal or a current signal to and sensing at least one of voltage signal or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some example peripheral circuits, which each include page buffer/sense amplifier 504, column decoder/bit-line driver 506, row decoder/word-line driver 508, voltage generator 510, control logic 512, register 514, interface 516 and data bus 518. It should be understood that in some examples, additional peripheral circuits not shown in FIG. 5 may also be included.

The page buffer/sense amplifier 504 may be configured to read data from and program (write) data to the array of memory cells 301 according to control signals from the control logic 512. In one example, the page buffer/sense amplifier 504 may store programming data (written data) to be programmed into the array of memory cells 301. In another example, the page buffer/sense amplifier 504 may perform a programming verify operation to ensure that data has been correctly programmed into memory cell 306 coupled to selected word line 318. In yet another example, the page buffer/sense amplifier 504 may also sense a low-power signal from bit line 316 representing a data bit stored in memory cell 306 and amplify a small voltage swing to a recognizable logic level during a read operation. The column decoder/bit line driver 506 may be configured to be controlled by control logic 512 and to select one or more memory strings 308 through applying a bit line voltage generated from voltage generator 510.

The row decoder/word line driver 508 may be configured to be controlled by control logic 512 and select/deselect memory block 304 of the array of memory cells 301 and select/deselect word line 318 of memory block 304. The row decoder/word line driver 508 may also be configured to drive word line 318 with a word line voltage generated from voltage generator 510. In some implementations, the row decoder/word line driver 508 may also select/deselect and drive the BSG line 315 and the TSG line 313. As described in detail below, the row decoder/word line driver 508 is configured to perform programming operations on the memory cells 306 coupled to the selected word line 318. The voltage generator 510 may be configured to be controlled by the control logic 512, and generate word line voltage (e.g., read voltage, programming voltage, pass voltage, channel-boost voltage, verify voltage, etc.), bit-line voltage and source line voltage to be supplied to the array of memory cells 301.

The control logic 512 may be coupled to each of other portions of the peripheral circuit described above and configured to control operations of each of the other portions of the peripheral circuit. The register 514 may be coupled to the control logic 512 and include status register, command register and address register for storing status information, command-operation code (OP code) and command address for controlling operations of each of the peripheral circuits. The interface 516 may be coupled to control logic 512 and act as a control buffer to buffer and relay control commands received from a host (not shown) to control logic 512 and to buffer and relay status information received from the control logic 512 to the host. Interface 516 may also be coupled to column decoder/bit line driver 506 via data bus 518 and act as a data I/O interface and data buffer to buffer and relay data to/from the array of memory cells 301.

The basic principle of three-dimensional NAND memory is that carriers (electrons or holes) cross the charge barrier and inject a certain amount of charge into the memory cell to complete the process of data write, the storage data may then be read in accordance with the threshold voltage when the memory cell is turned on. Therefore, in order to read correct data, an ECC error-correction algorithm with strong error-correction capability and high efficiency is usually introduced when reading data.

However, as the use time increases, the charge stored in the memory cell will change with the increase in use time, repeated read operations, cross temperature, etc., thereby affecting the accuracy of data reading. When the threshold voltage shifts upward or downward significantly, when the original read voltage is used to read data in the memory cell, the possibility of a read-error occurrence is increased, and a read error exceeding the ECC error-correction capability will also cause data read of the memory cell to fail.

Figure 6:
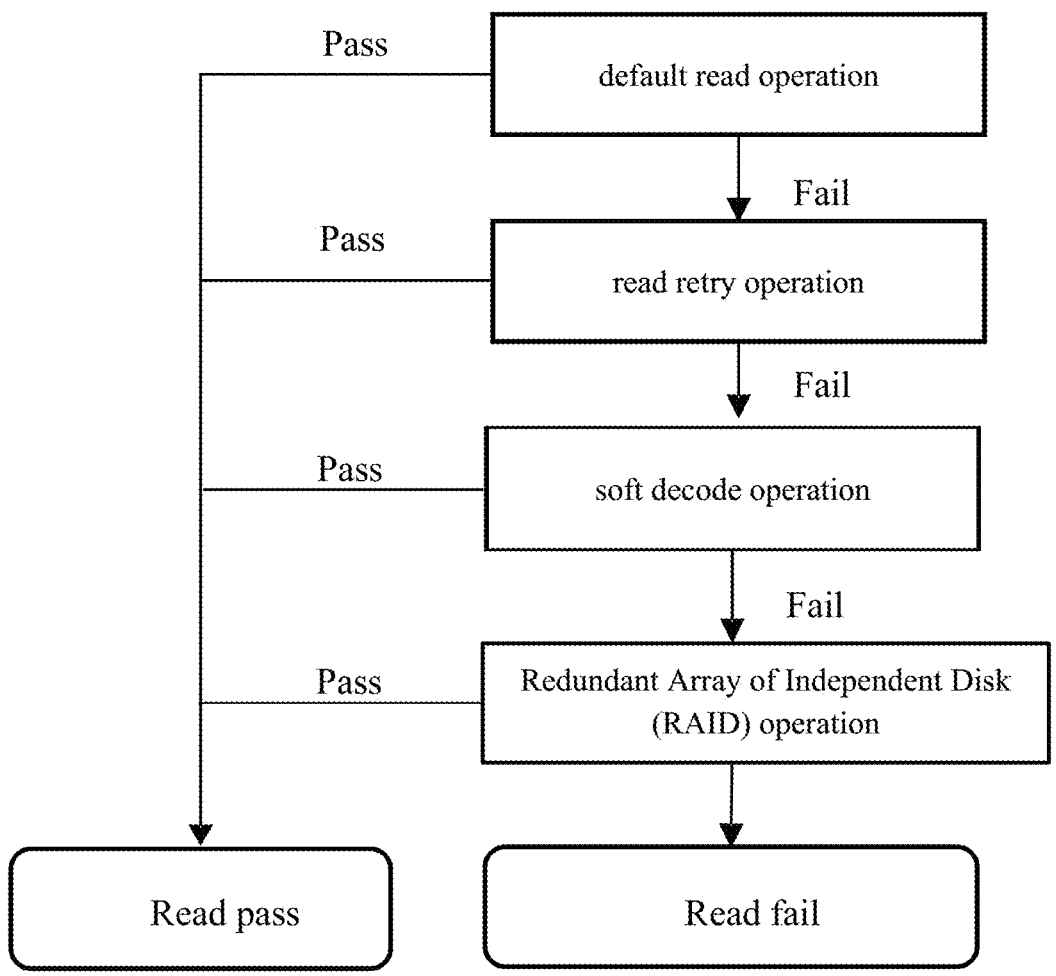
FIG. 6 is a schematic diagram of an example flow of a read operation on a memory system provided by the present application.

FIG. 6 illustrates a schematic diagram of an example read operation flow of a memory system. Combined with what is shown in FIG. 6, when the memory controller controls the memory device to perform a read operation, a default-read operation (FW) is first performed on the memory cell at the corresponding physical address; if the default-read operation fails, a read-retry operation is performed; after the read-retry operation fails, a soft-decode operation is performed; after the soft decode fails, a Redundant Array of Independent Disk (RAID) operation is performed; and after the RAID operation fails, the read operation stops and the read fails because the error cannot be corrected; then, the memory controller sends a read fail signal to the host 108. Read-retry operation and default-read operation may be applicable to hard decode.

In some implementations, the read-retry operation may be performed through querying the retry table provided by the manufacturer. The essence of the read-retry operation is an error-correction mechanism, the retry table may provide a reference voltage for reading data, which attempts to read each memory cell again with a read voltage that deviates from the normal threshold voltage through querying the retry table, combined with ECC error correction algorithm for error correction, thereby attempting to read data correctly. If the erroneous read data is corrected, query for the retry table is stopped. If the erroneous read data cannot be corrected, the retry table will be queried until the entire retry table is traversed.

The read-retry operation described above queries the retry table one-by-one, which will inevitably increase the number of retry and take a long time. In addition, the retry provided by the manufacturer is only a reference value in some specific environments, and the real usage scenarios are ever-changing; therefore, some scenarios cannot be covered by the retry table provided by the manufacturer. Consequently, even if the retry table is traversed, the data may not be corrected, resulting in a lot of wasted time processing the command. In summary, the method of performing read-retry operation through repeatedly polling the retry table takes an undesirable amount of time, affects the response time of subsequent commands, and affects the performance of the device.

Based on one or more of the problems described above, an example of this application proposes a method for operating a memory device.

Figure 7:
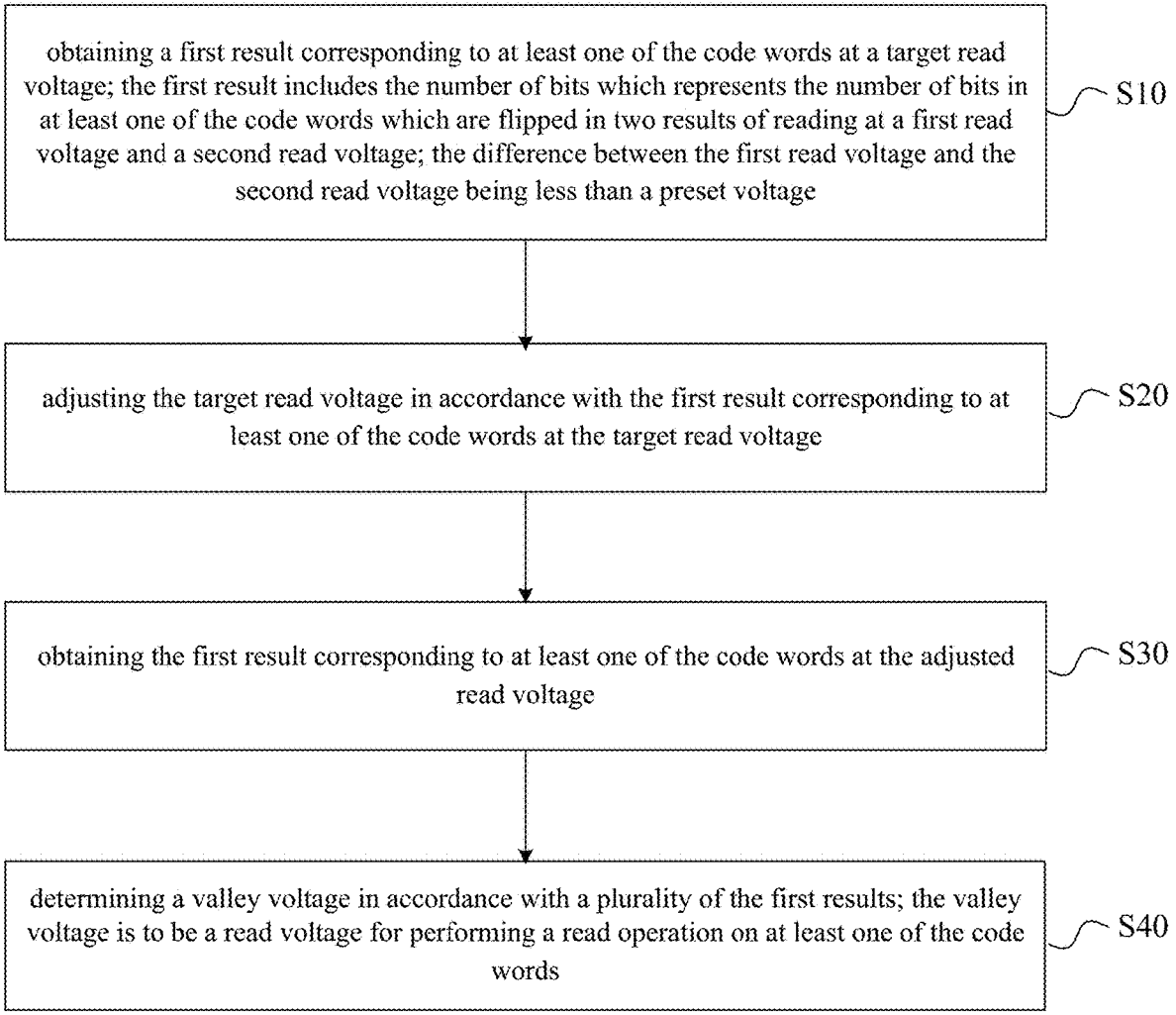
FIG. 7 is a schematic flowchart of an implementation of a method for operating a memory device provided by an example of the present application.

FIG. 7 is a schematic flowchart of an implementation of a method for operating a memory device provided by an example of the present application. As shown in FIG. 7, the memory device includes an array of memory cells, the array of memory cells includes a plurality of memory cells, a preset number of the memory cells form a code word (CW); the method for operating a memory device includes the following operations.

At operation S10, the method may include obtaining a first result corresponding to at least one of the code words at a target read voltage; the first result includes the number of bits which represents the number of bits in at least one of the code words which are flipped in two results of reading at a first read voltage and a second read voltage; the difference between the first read voltage and the second read voltage being less than a preset voltage;

At operation S20, the method may include adjusting the target read voltage in accordance with the first result corresponding to at least one of the code words at the target read voltage.

At operation S30, the method may include obtaining the first result corresponding to at least one of the code words at the adjusted read voltage.

At operation S40, the method may include determining a valley voltage in accordance with a plurality of the first results; the valley voltage is a read voltage for performing a read operation on at least one of the code words.

Here, the structure of the memory device refers to FIG. 3b described above and will not be repeated here.

Here, a preset number of the memory cells forming a code word.

In some examples, the number of memory cells contained in one code word is the same as the number of memory cells contained in one encoding or decoding when error correction encoding or decoding is being performed. In some examples, the number of memory cells contained in a code word may be less than or equal to the number of memory cells coupled to a page, e.g., the number of memory cells contained in a code word is ¼ of the number of memory cells coupled to a page. In some examples, a code word may include a number of memory cells ranging from 24 to 212. In one example, a code word may include 24, 28, or 212 memory cells.

In general, different memory systems may choose code words of different sizes to meet their requirement for performance, reliability, and storage.

Memory cells in different types of memory devices (e.g., MLC, TLC or QLC) may store different numbers of bits; thus, for the code words of a same size, the numbers of memory cells included may also be different.

For example, in an implementation, the size of a code word is 4 KB, and taking the memory cell in the array of memory cells being MLC as an example, each memory cell stores 2 bits, thus the number of memory cells included in the code word is 211.

For example, in another implementation, the size of a code word is 4 KB, and taking the memory cell in the array of memory cells being QLC as an example, each memory cell stores 4 bits; thus, the number of memory cells included in the code word is 210.

It should be noted that in practice, in a code word, there may be reserve some additional reserved space for management and error correction; thus, the number of memory cells required in practice may slightly exceed the calculation results described above.

It may be understood that a code word may include a plurality of memory cells, and the number of memory cells included in a code word may be adjusted according to actual situations.

It should be noted that in some examples, during the process of reading the memory device, data in one page may be read by one read operation, and when the number of memory cells included in one code word may be less than the number of memory cells coupled to one page, the code word is a unit on which may be performed to obtain the first result, but the case of multiple code words is not excluded in practice. In other words, the first result corresponding to at least one of the code words at the current read voltage may be obtained here. For example, a page may include 4 code words, a hardware operation for the page buffer may count the Fail-Bit Count (FBC) of each of four code words at one time, and then the FBCs of the four code words are added to obtain the FBC of one page, and the added value is used for subsequent calculations. It may be understood that the first result here is based on data in one page, which may include multiple code words.

In some examples, the read mode of the memory device is set to a single-level read (SLR) mode before obtaining the first result corresponding to at least one of the code words at the target read voltage; the single level read mode includes reading at least one bit of the storage data stored in the memory cell with read voltages at one level.

In some examples, the memory cell includes M bits, the memory device includes M-type pages, and the memory cell with M bits reads its M bits of storage data with read voltages at N levels; the M and N are both integers greater than 1, and $N=2^M-1$.

The method may further include, for read voltages at each level of the read voltages at multiple levels corresponding to each type of page, determining the valley voltage at each level in accordance with the plurality of first results corresponding to the multiple read voltages at each level.

Figure 8:
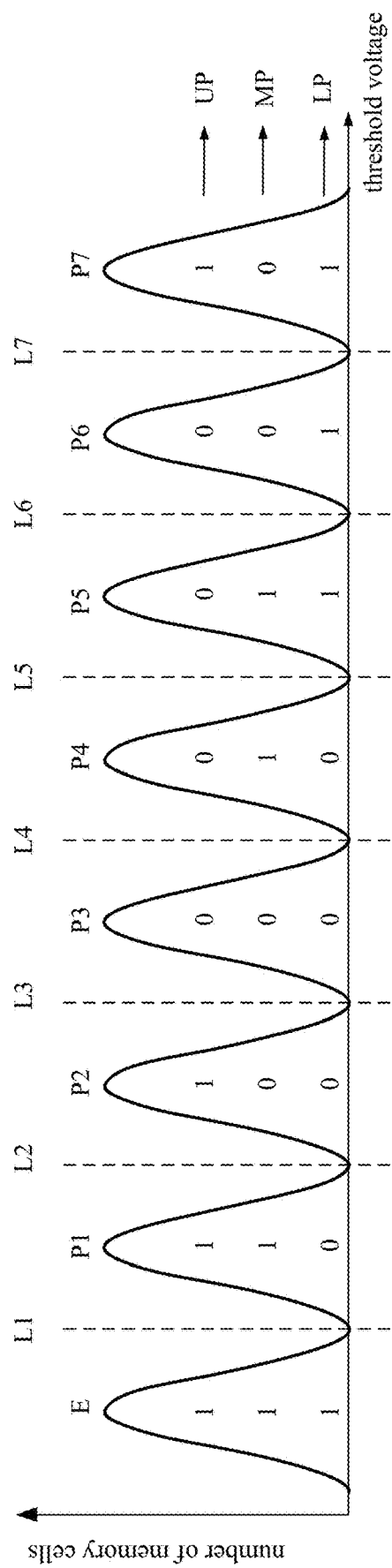
FIG. 8 is a schematic diagram of the threshold voltage distribution corresponding to a memory cell including 3 memory bits provided by an example of the present application.

In one example, when the number of bits stored in the memory cell include three bits, the corresponding storage states include the 0-th state to the 7-th state, referring to FIG. 8, the 8 states are the 0-th (also referred to as erase state) state E, the first state (also referred to as the first storage state) P1, the second state (also referred to as the second storage state) P2 . . . the 7-th state (also referred to as the 7-th storage state) P7, and the binary data corresponding to the 8 states are 111, 110, 100, 000, 010, 011, 001, 101, respectively. Accordingly, the memory device includes three types of pages, namely lower page (LP), middle page (MP), and upper page (UP).

Taking the memory cell shown in FIG. 8 as an example, the three bits and the eight states of storage data may be read by the three-bit memory cell with read voltages at 7 levels (the first-level read voltage L1, the second-level read voltage L2, and the third-level read voltage L3, the fourth-level read voltage L4, the fifth-level read voltage L5, the sixth-level read voltage L6 and the seventh-level read voltage L7 as shown in FIG. 8).

In some examples, the method for operating the memory device further includes, for read voltages at each level of the read voltages at multiple levels corresponding to each type of page, determining the valley voltage at each level in accordance with the plurality of first results corresponding to the multiple read voltages at each level.

In one example, each type of page corresponds to read voltages at multiple levels. As shown in FIG. 8, the lower page corresponds to a first-level read voltage L1 and a fifth-level read voltage L5. The middle page corresponds to the second-level read voltage L2, the fourth-level read voltage L4, and the sixth-level read voltage L6. The upper page corresponds to the third-level read voltage L3 and the seventh-level read voltage L7. For the first-level read voltage L1 and the fifth-level read voltage L5 corresponding to the lower page, the valley voltage in the first-level read voltage L1 may be determined in accordance with a plurality of first results corresponding to the multiple read voltages in the first-level read voltage L1. Then, the valley voltage in the fifth-level read voltage L5 may be determined in accordance with the plurality of first results corresponding to the multiple read voltages in the fifth-level read voltage L5, thus, the valley voltage in read voltages at each level of read voltages at multiple levels corresponding to the lower page may be obtained. The process of determining the valley voltage in the read voltages at each level of the read voltages at multiple levels corresponding to the middle page and the upper page is similar to that of the lower page, and will not be repeated here.

The lower page is usually closest to the source/drain, thus the valley voltage in read voltages at each level of read voltages at multiple levels corresponding to the lower page is determined in a higher priority, which results in the fastest access speed and the shortest response time, and ensures balanced performance and durability during data access.

It should be noted that the method for determining the valley voltage in the read voltages at each level of the read voltages at multiple levels corresponding to the lower page in a higher priority is only an example and is not used to limit the order for determining the valley voltage in the read voltages at each level of the read voltages at multiple levels corresponding to each type of page in the example of the present application.

Figure 9:
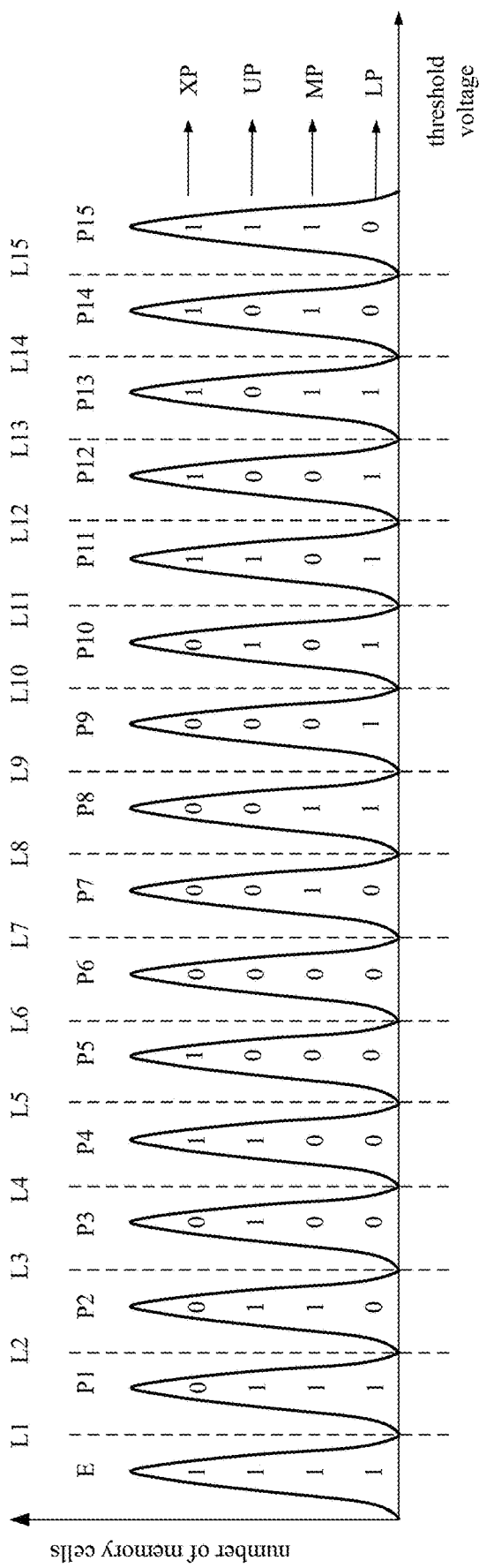
FIG. 9 is a schematic diagram of the threshold voltage distribution corresponding to a memory cell including 4 memory bits provided by an example of the present application.

In one example, when the stored bits in the memory cell include four bits, the corresponding storage states include the 0-th state to the 15-th state. Referring to FIG. 9, the 16 states are the 0-th (also referred to as erase state) state E, the first state (also referred to as the first storage state) P1, the second state (also referred to as the second storage state) P2 . . . the 15-th state (also referred to as the 15-th storage state) P15, and the binary data corresponding to the 16 states are 1111, 0111, 0110 . . . 1110 respectively. Accordingly, the memory device includes four types of pages, namely lower page, middle page, upper page, and extra page (XP). Here, the four stored bits corresponding to the 16 states are stored in the lower page, middle page, upper page, and extra page respectively.

Taking the memory cell shown in FIG. 9 as an example, the four bits and the sixteen states of storage data may be read by the four-bit memory cell with read voltages at 15 levels (the first-level read voltage L1, the second-level read voltage L2, and the third-level read voltage L3, the fourth-level read voltage L4, the fifth-level read voltage L5, the sixth-level read voltage L6, the seventh-level read voltage L7, the eighth-level read voltage L8, the ninth-level read voltage L9, the tenth-level read voltage L10, the eleventh-level read voltage L11, the twelfth-level read voltage L12, the thirteenth-level read voltage L13, the fourteenth-level read voltage L14, the fifteenth-level read voltage L15, as shown in FIG. 9).

In one example, each type of page corresponds to read voltages at multiple levels. As shown in FIG. 9, the lower page corresponds to the second-level read voltage L2, the eighth-level read voltage L8, and the fourteenth-level read voltage L14. The middle page corresponds to the third-level read voltage L3, the seventh-level read voltage L7, the ninth-level read voltage L9, and the thirteenth-level read voltage L13. The upper page corresponds to the fifth-level read voltage L5, the tenth-level read voltage L10, the twelfth-level read voltage L12, and the fifteenth-level read voltage L15. The extra page corresponds to the first-level read voltage L1, the fourth-level read voltage L4, the sixth-level read voltage L6, and the eleventh-level read voltage L11.

For the second-level read voltage L2, the eighth-level read voltage L8, and the fourteenth-level read voltage L14 corresponding to the lower page, the valley voltage in the second-level read voltage L2 may be determined in accordance with a plurality of first results corresponding to the multiple read voltages in the second-level read voltage L2. Then, the valley voltage in the eighth-level read voltage L8 may be determined in accordance with a plurality of first results corresponding to the multiple read voltages in the eighth-level read voltage L8. Finally, the valley voltage in the fourteenth-level read voltage L14 may be determined in accordance with the plurality of first results corresponding to the multiple read voltages in the fourteenth-level read voltage L14; thus, the valley voltage in the read voltages at each level of the read voltages at multiple levels corresponding to the lower page may be obtained. The process of determining the valley voltage in the read voltages at each level of the read voltages at multiple levels corresponding to the middle page and the upper page is similar to that of the lower page, and will not be repeated here.

Figure 10:
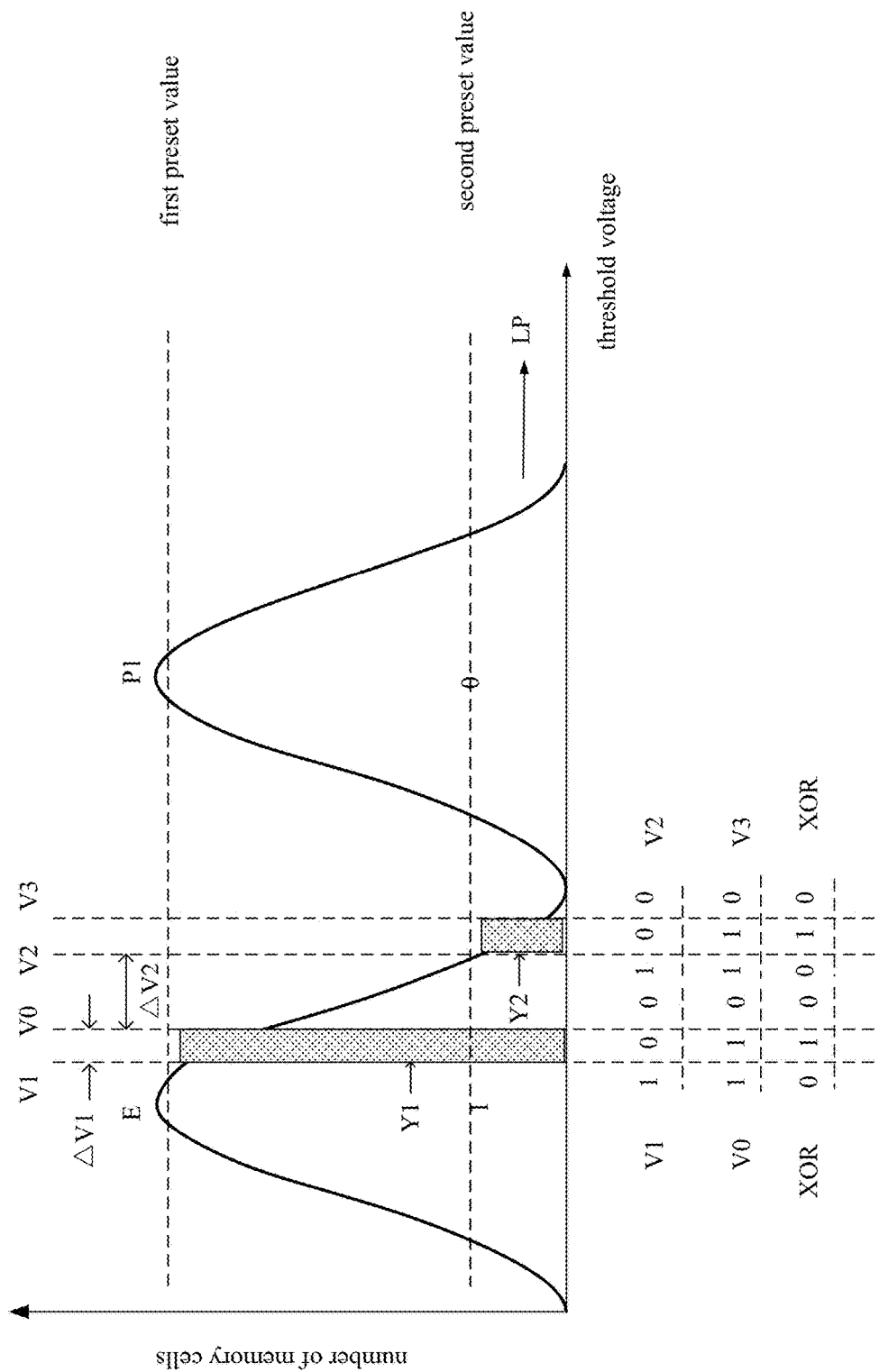
FIG. 10 is a schematic diagram of a method for confirming the valley voltage in the first-level read voltage L1 corresponding to the lower page shown in FIG. 8 provided by an example of the present application.
Figure 11:
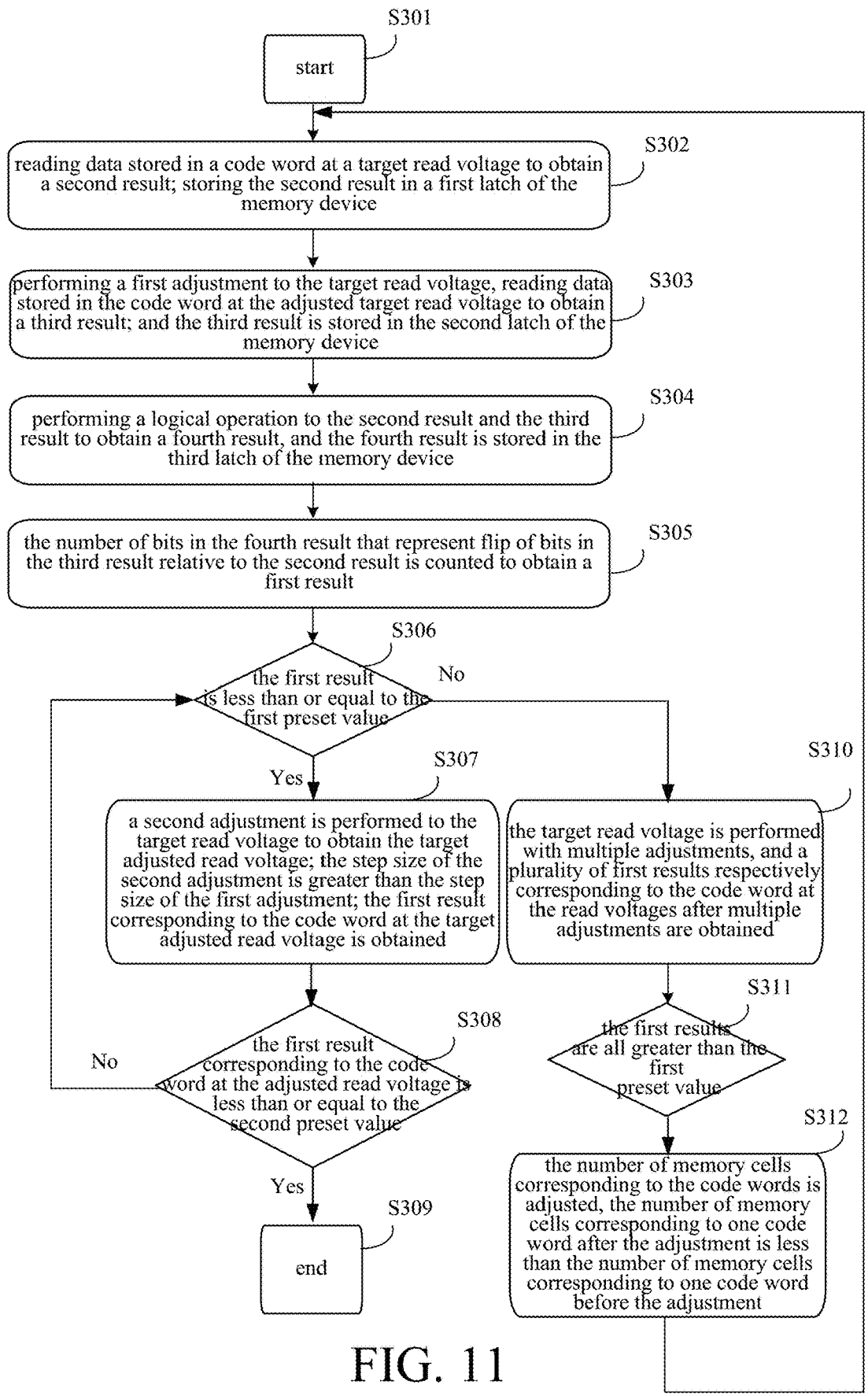
FIG. 11 is a flowchart of a method for operating a memory device provided by an example of the present application.

FIG. 10 is a schematic diagram of a method for confirming the valley voltage in the first-level read voltage L1 corresponding to the lower page shown in FIG. 8 provided by an example of the present application. FIG. 11 is a flowchart of a method for operating a memory device provided by an example of the present application. The process of determining a valley voltage may be described in detail below combined with FIGS. 8, 10 and 11.

At operation S301, the method may include obtaining the first preset value and the second preset value; the first preset value is equal to an upper limit of the fail bit count (FBC) supported by the memory device.

At operation S302, the method may include reading data stored in a code word at a target read voltage to obtain a second result, and storing the second result in a first latch of the memory device.

In one example, as shown in FIG. 10, reading data stored in at least one of the code words at the target read voltage V0 to obtain a second result. In one example, the data stored in the lower pages of the memory cells in the code word is read at the target read voltage V0, the memory cell with a threshold voltage being less than the target read voltage V0 is labeled as bit 1, and the memory cell with a threshold voltage being greater than the target read voltage V0 is labeled as bit 0; thus, a second result is obtained and stored in the first latch of the memory device.

It should be noted that the target read voltage V0 used for the first time here may refer to a preset read voltage that can distinguish between two adjacent storage states of the memory cell of the memory device in the previous read process. The preset read voltage may be an empirical value, or it may be default values configured when the memory device leaves the factory. The default value is obtained through simulation experiments before the memory device leaves the factory.

At operation S303, the method may include performing a first adjustment to the target read voltage, and reading data stored in the code word at the adjusted target read voltage to obtain a third result. The third result may be stored in the second latch of the memory device.

Here, the first adjustment may be understood as an adjustment with a small amplitude. In some examples, the small amplitude refers to here, e.g., the range of the step size of the first adjustment is set to 5 mV to 20 mV, e.g., the step size of the first adjustment may be 5 mV, 10 mV, 15 mV, 20 mV.

It should be noted that the first read voltage and the second read voltage are related before and after the first adjustment; that is to say, the second read voltage is obtained after adjusting the first read voltage for the first time. Thus, the voltage difference between the first read voltage and the second read voltage is the step size of the first adjustment. The difference between the first read voltage and the second read voltage being less than the preset voltage may be understood that a smaller voltage difference may be between the first read voltage and the second read voltage. The preset voltage is related to the step size of the first adjustment, and may be a voltage slightly larger than the step size of the first adjustment. In some examples, the range of the preset voltage is set to 6 mV to 21 mV, e.g., the preset voltage may be 6 mV, 11 mV, 16 mV, and 21 mV.

It should be noted that the first read voltage and the second read voltage are both general concepts, and the target read voltage and all subsequent read voltages after the second adjustment may be referred to as a first read voltage, and all read voltages after the first adjustment may be referred to as a second read voltage.

In one example, as shown in FIG. 10, a first adjustment is performed to the target read voltage V0, and the data stored in the code word is read at the adjusted target read voltage (V1 shown in FIG. 10) to obtain a third result. In one example, the data stored in the lowers page of the memory cells in the code word are read at the adjusted target read voltage (V1 shown in FIG. 10), the memory cell with a threshold voltage being less than the adjusted target read voltage (V1 shown in FIG. 10) is labeled as bit 1; the memory cell with a threshold voltage being greater than the adjusted target read voltage (V1 shown in FIG. 10) is labeled as bit 0; thus, a third result is obtained and stored in a second latch of the memory device.

As shown in FIG. 10, there is a first voltage difference $\Delta V1$ between the target read voltage V0 and the adjusted target read voltage V1, and the size of the first voltage difference is the step size of the first adjustment. The amplitude of the step size of the first adjustment is relatively small, and the first adjustment may be understood as an adjustment with a small amplitude.

At operation S304, a logical operation is performed on the second result and the third result to obtain a fourth result, and the fourth result is stored in the third latch of the memory device.

In one example, as shown in FIG. 10, an XOR operation is performed on the second result and the third result to obtain a fourth result, and the fourth result is stored in the third latch of the memory device.

It should be noted that the XOR operation is one of the basic logical operations; in binary, if two binary numbers at the same position are the same, the result is "0"; and if two binary numbers at the same position are different, the result is "1" (e.g., same is 0, and different is 1).

At operation S305, the number of bits in the fourth result that represent flip of bits in the third result relative to the second result is counted to obtain a first result.

In one example, as shown in FIG. 10, the part in which the bit is 1 in the fourth result represents the number of memory cells with threshold voltages being different at the target read voltage V0 and the adjusted target read voltage V1; in other words, the part in which the bit is 1 in the fourth result represents the number of bits in the code word that are flipped in the two results of reading at the target read voltage V0 and the adjusted target read voltage V1. Since the single level read mode is employed, e.g., both of the two read operations described above are to read one bit of data stored in the lower page of the memory cell in the code word; the part in which the bit is 1 in the fourth result represents the number of memory cells in the code word that are flipped in the two results of reading at the target read voltage V0 and the adjusted target read voltage V1; the number is denoted as the first result Y1 corresponding to the target read voltage. It should be noted that the target read voltage V0 here is the first read voltage, and the adjusted target read voltage V1 is the second read voltage.

At operation S306, the first result is compared with the first preset value to determine whether the first result is less than or equal to the first preset value.

In some examples, the first preset value is equal to the upper limit of the fail bit count supported by the memory device. The upper limit of the fail bit count supported by the memory device means that fail bits within the upper limit may be detected and corrected through the built-in error-correction mechanism, while fail bits exceeding the upper limit cannot be corrected. In one example, when the first result is greater than the first preset value (e.g., the upper limit of the fail bit count supported by the memory device), this means that when the read voltage corresponding to the first result is to be the valley voltage, the read result may contain uncorrectable errors, and data integrity and reliability may be threatened. Therefore, to ensure that the first result can be used to determine the valley voltage, the range of the first result may be defined, and only the first result less than the first preset value may be used as one of the plurality of first results for determining the valley voltage.

The size of the first preset value is related to the type of memory device, storage density, etc. The first preset value may be an empirical value, or it may be default values configured when the memory device leaves the factory. The default value may be obtained through simulation experiments before the memory device leaves the factory. In one example, the range of the first preset value is set to 225 to 280, and in another example, the first preset value may be 225, 230, 240, 250, 260, 270, 280.

If the first result is less than or equal to the first preset value, operation S307 is performed.

As shown in FIG. 10, if the first result corresponding to the target read voltage is less than the first preset value, operation S307 is performed. At operation S307, a second adjustment is performed to the target read voltage to obtain the target adjusted read voltage; the step size of the second adjustment is greater than the step size of the first adjustment; the first result corresponding to the code word at the target adjusted read voltage is obtained.

Here, the second adjustment may be understood as an adjustment with a large amplitude, and in some examples, the large amplitude here, e.g., the range of the step size of the second adjustment is set to 50 mV to 80 mV, e.g., the step size of the second adjustment may be 50 mV, 60 mV, 70 mV, 80 mV.

It should be noted that the target read voltage here and all subsequent read voltages after the second adjustment may be referred to as a first read voltage, and all the read voltages after the first adjustment may be referred to as a second read voltage. In one example, as shown in FIG. 10, a second adjustment is performed to the target read voltage V0 to obtain the target adjusted read voltage V2, there is a second voltage difference ΔV2 between the target read voltage V0 and the target adjusted read voltage V2, and the size ΔV2 of the two voltage differences is the step size of the second adjustment. The step size of the second adjustment is greater than the step size of the first adjustment, e.g., the second voltage difference Δ V2 is greater than the first voltage difference ΔV1. The step size of the second adjustment is relatively large, and the second adjustment may be understood as an adjustment with a large amplitude. It should be noted that the target adjusted read voltage V2 here is the first read voltage.

The data stored in the lower page of the memory cell in the code word is read at the target adjusted read voltage V2, the memory cell with a threshold voltage being less than the target adjusted read voltage V2 after adjustment is labeled as bit 1, and the memory cell with a threshold voltage being greater than the target adjusted read voltage V2 is labeled as bit 0; a second result is obtained and stored in the first latch of the memory device.

A first adjustment is performed to the target adjusted read voltage V2, and the data stored in the code word is read at the target adjusted read voltage after adjustment (V3 shown in FIG. 10) to obtain a third result. In one example, the data stored in the lower page of the memory cell in the code word is read at the target adjusted read voltage after adjustment (V3 shown in FIG. 10), the memory cell with a threshold voltage being less than the target adjusted read voltage after adjustment (V3 shown in FIG. 10) is labeled as bit 1, the memory cell with a threshold voltage being greater than the target adjusted read voltage after adjustment (V3 shown in FIG. 10) is labeled as bit 0, a third result is obtained, and stored in a second latch of the memory device. It should be noted that the target adjusted read voltage after adjustment (V3 shown in FIG. 10) here is the second read voltage.

An XOR operation is performed on the second result and the third result to obtain a fourth result, and the fourth result is stored in the third latch of the memory device. In one example, as shown in FIG. 10, the part in which the bit is 1 in the fourth result represents the number of memory cells with threshold voltages being different at the target adjusted read voltage V2 and the target adjusted read voltage V3 after adjustment; in other words, the part in which the bit is 1 in the fourth result represents the number of bits in the code word that are flipped in the two results of reading at the target adjusted read voltage V2 and the target adjusted read voltage V3 after adjustment. Since the single level read mode is employed, e.g., both of the two read operations described above are to read one bit of data stored in the lower page of the memory cell in the code word; the part in which the bit is 1 in the fourth result represents the number of memory cells in the code word that are flipped in the two results of reading at the target adjusted read voltage V2 and the target adjusted read voltage V3 after adjustment; and the number is denoted as the first result Y2 corresponding to the target adjusted read voltage V2.

It may be understood that the direction of the second adjustment of the target read voltage V0 for the first time may be random, it is only required to ensure that the absolute value of the voltage difference between the target adjusted read voltage V2 obtained after the second adjustment to the target read voltage V0 and the target read voltage V0 is performed on the target read voltage V0 is equal to the step size of the second adjustment. It may be understood that the target adjusted read voltage V2 may be greater than or less than the target read voltage V0.

At operation S308, the first result corresponding to the code word at the adjusted read voltage is compared with the second preset value to determine whether the first result is less than or equal to the second preset value.

In some examples, the second preset value is used as the determination threshold for determining the valley voltage; that is, when the first result is less than or equal to the second preset value, it indicates that the error rate of the read result is low and the reliability of the read result is high when the read voltage corresponding to the first result is the valley voltage.

The size of the second preset value is related to the type of memory device, storage density, etc. The second preset value may be an empirical value, or it may be default values configured when the memory device leaves the factory, the default value is obtained through extensive simulation experiments before the memory device leaves the factory. In one example, the range of the second preset value is set to 5 to 30, and in another example, the second preset value may be 5, 10, 15, 20, 25, 30.

In some examples, when operation S308 is performed after operation S307, if the first result corresponding to the code word at the adjusted read voltage (e.g., the target adjusted read voltage) is less than or equal to the second preset value, operation S309 is performed and the operation ends. It may be understood that the target adjusted read voltage at this point may be the valley voltage in the first-level read voltage L1 corresponding to the lower page shown in FIG. 8.

In other examples, when operation S308 is performed after operation S307, if the first result corresponding to the code word at the adjusted read voltage (e.g., the target adjusted read voltage) is greater than the second preset value, the operations may return to operation S306. At operation S306, the first result greater than the second preset value is compared with the first preset value to determine whether the first result is less than or equal to the first preset value. If the first result corresponding to the code word at the adjusted read voltage (e.g., the target adjusted read voltage) is less than or equal to the first preset value and greater than the second preset value, then operation S307 is continued to be performed; at this point, the target read voltage referred to at operation S307 is the target adjusted read voltage. In accordance with the first result corresponding to the code word at the target adjusted read voltage, a second adjustment is performed to the target adjusted read voltage to obtain the adjusted read voltage and the first result corresponding to the code word at the adjusted read voltage.

In some examples, in accordance with the first result corresponding to the code word at the target adjusted read voltage, the direction of the second adjustment performed on the target adjusted read voltage is related to the relationship of size between the first result Y1 corresponding to the target read voltage V0 and the first result Y2 corresponding to the target adjusted read voltage V2.

For example, as shown in FIG. 10, after the second adjustment is performed to the target read voltage V0 for the first time, the target adjusted read voltage V2 is greater than the target read voltage V0, and Y2 is less than Y1, indicating that adjusting the target read voltage V0 to the right (the direction of increasing the voltage) enables to reduce the number of bits flipped in the two results of reading at the respective read voltages. Therefore, when the second adjustment is performed to the target adjusted read voltage for the second time, the target adjusted read voltage V2 will preferably continue to be adjusted to the right to obtain the adjusted read voltage and the first result corresponding to the code word at the adjusted read voltage.

It may be understood that the direction of the second adjustment of a certain read voltage will be selected in accordance with the variation trend of the first results before and after the previous second adjustment, so as to further reduce the number of bits flipped in the two results of reading at the adjusted read voltages.

After obtaining the adjusted read voltage and the first result corresponding to the code word at the adjusted read voltage, operation S308 may proceed.

If it is determined that the first result corresponding to the adjusted read voltage is less than or equal to the second preset value, operation S309 is performed and the operation ends.

In some examples, determining the valley voltage in accordance with a plurality of the first results includes: when a first result corresponding to a final adjusted read voltage is less than or equal to the second preset value, the read voltage corresponding to the smallest first result among the first results is to be the valley voltage.

In one example, Table 1 is an example of a plurality of first results obtained with multiple iterations.

TABLE 1

| The number of iterations | The first result |
| --- | --- |
| 1 | 200 |
| 2 | 160 |
| 3 | 70 |
| 4 | 5 |
| 5 | 40 |
| 6 | 100 |
| 7 | 190 |

As shown in Table 1, the first result obtained in the first iteration is 200, which may be understood as the first result corresponding to the target read voltage V0. The first result obtained in the second iteration is 160, which may be understood as the first result corresponding to the target adjusted read voltage V2. The first result obtained in the third iteration is 70, and the first result obtained in the fourth iteration is 5.

In one example, the first preset value is set to 225, and the second preset value is set to 10.

In some examples, during the process of performing the method for operating the memory device shown in FIG. 11, when the first result obtained in the fourth iteration is less than or equal to the second preset value, a preset number of iterations may be continued to additionally obtain a plurality of first results. Thus, the accuracy of determining the valley voltage in accordance with a plurality of the first results can be further enhanced. In one example, the first results obtained from the fifth iteration to the seventh iteration are shown in Table 1.

The read voltage corresponding to the smallest first result among the plurality of first results in Table 1 is to be the valley voltage, e.g., the read voltage corresponding to the first result obtained in the fourth iteration is to be the valley voltage.

It may be understood that the read voltage corresponding to the first result obtained in the fourth iteration is the valley voltage in the first-level read voltage L1 corresponding to the lower page shown in FIG. 8.

It should be noted that, in practice, the number of iterations (e.g., the number of second adjustments performed to the read voltage) may be changed according to actual needs; the implementation of obtaining 7 first results for determining the valley voltage with 7 iterations is provided by way of example and not limitation.

If the determination result of operation S306 in FIG. 11 is that the first result is greater than the first preset value, then operation S310 is performed, and the target read voltage is performed with multiple adjustments, and a plurality of first results respectively corresponding to the code word at the read voltages after multiple adjustments are obtained.

It should be noted that the direction and step size of the multiple adjustments to the target read voltage here may be random, to randomly obtain a plurality of first results.

After a plurality of first results are obtained, operation S311 is performed.

At operation S311, the plurality of first results are compared with the first preset value to determine whether the plurality of first results are all greater than the first preset value. When a plurality of first results are greater than the first preset value, operation S312 is performed.

At operation S312, the number of memory cells corresponding to the code words is adjusted, the number of memory cells corresponding to the code word after the adjustment is less than the number of memory cells corresponding to the code word before the adjustment. Then, the operation S302 is performed again.

It may be understood that by reducing the number of memory cells corresponding to the code word, the total amount of data contained in the fourth result may be reduced, and the reduction of the total amount may reduce the number counted from the total amount to a certain extent, e.g., the first result will also decrease, therefore it is easier for the first result to be within the range of the first preset value.

It should be noted that the process of determining the valley voltage in read voltages at other levels corresponding to the lower page and the processes of determining the valley voltages in the read voltages at multiple levels corresponding to the middle page and upper page are similar to the method disclosed in the example described above and will not be repeated here.

The method for operating the memory device provided by the example of the present application including, counting the number of bits in a code word containing a preset number of memory cells which are flipped in two results of reading at a corresponding read voltage and at a voltage close to the corresponding read voltage as a first result; adjusting the target read voltage in accordance with the first result corresponding to at least one of the code words at the target read voltage; and then obtaining the first result corresponding to at least one of the code words at the adjusted read voltage; and determining the valley voltage in accordance with the minimum value among the plurality of first results as the read voltage for performing a read operation on the code word. Thus, this method is able to effectively avoid the problems of long time consumption and incomplete scene coverage caused by using the retry table, and to save the space occupied by the retry table, find the valley voltage more quickly and accurately, thereby effectively reducing the time delay in determining the valley voltage and improving product reliability and user experience.

It should be noted that the methods disclosed in the examples of the present application are able to solve many problems existing in the re-reading operation, but are not used to limit the application scenarios in the examples of the present application, and the methods disclosed in the examples of the present application are also applicable to conventional read operations.

An example of the present application provides a memory device, as shown in FIG. 3b, the memory device 300 may include an array of memory cells 301. The array of memory cells 301 may include a plurality of memory cells 306, a preset number of memory cells 306 forming a code word. Peripheral circuit 302 may be coupled to the array of memory cells 301 and configured to perform the following operations shown in FIG. 7.

For example, at operation S10, the method may include obtaining a first result corresponding to at least one of the code words at a target read voltage; the first result including the number of bits which represents the number of bits in at least one of the code words which are flipped in two results of reading at a first read voltage and a second read voltage; the difference between the first read voltage and the second read voltage being less than a preset voltage. At operation S20, the method may include adjusting the target read voltage in accordance with the first result corresponding to at least one of the code words at the target read voltage.

At operation S30, the method may include obtaining the first result corresponding to at least one of the code words at the adjusted read voltage.

At operation S40, the method may include determining a valley voltage in accordance with a plurality of the first results; the valley voltage is a read voltage for performing a read operation on at least one of the code words.

Here, the structure of the memory device refers to FIG. 3b described above, and the structure of the peripheral circuit refers to FIG. 5 described above, which will not be repeated here.

In some examples, the peripheral circuit is configured to set the read mode of the memory device to a single level read mode before obtaining the first result corresponding to the code word at the target read voltage; the single level read mode includes reading at least one bit of the storage data stored in the memory cell with read voltages at one level.

In some examples, the memory cell includes M bits, the memory device includes M-type pages, and the memory cell with M bits reads its M bits of storage data with read voltages at N levels; the M and N are both integers greater than 1, and $N=2^M-1$; the peripheral circuit is configured to, for read voltages at each level of the read voltages at multiple levels corresponding to each type of page, determine the valley voltage at each level in accordance with the plurality of first results corresponding to the multiple read voltages at each level.

In one example, when the stored bits in the memory cell include three bits, the corresponding storage states include the 0-th state to the 7-th state, referring to FIG. 8, the 8 states are the 0-th state E, the first state P1, the second state P2 . . . the 7-th state P7, and the binary data corresponding to the 8 states are 111, 110, 100, 000, 010, 011, 001, 101, respectively. Accordingly, the memory device includes three types of pages, namely lower page, middle page, and upper page. Here, the three stored bits corresponding to the 8 states are stored in the lower page, middle page, and upper page respectively. Taking the memory cell shown in FIG. 8 as an example, the three-bit memory cell reads its three bits of storage data with read voltages at 7 levels.

In one example, each type of page corresponds to read voltages at multiple levels, as shown in FIG. 8, and the lower page corresponds to a first-level read voltage L1 and a fifth-level read voltage L5. For the first-level read voltage L1 and the fifth-level read voltage L5 corresponding to the lower page, the valley voltage in the first-level read voltage L1 may be determined in accordance with a plurality of first results corresponding to the multiple read voltages in the first-level read voltage L1. Then, the valley voltage in the fifth-level read voltage L5 may be determined in accordance with the plurality of first results corresponding to the multiple read voltages in the fifth-level read voltage L5; thus, the valley voltage in the read voltages at each level of read voltages at multiple levels corresponding to the lower page may be obtained.

The process of determining the valley voltage in the read voltages at each level of the read voltages at multiple levels corresponding to the middle page and the upper page is similar to that of the lower page, and will not be repeated here.

In some examples, the peripheral circuit is configured to: read data stored in the code word at the target read voltage to obtain a second result; perform a first adjustment to the target read voltage and read data stored in the code word at the adjusted target read voltage to obtain a third result; perform a logical operation on the second result and the third result to obtain a fourth result; count the number of bits in the fourth result that represent flip of bits in the third result relative to the second result to obtain a first result.

In some examples, the peripheral circuit includes a first latch D1, a second latch D2, and a third latch D3; the first latch D1 is configured to store the second result; the latch D2 is configured to store the third result; and the third latch D3 is configured to store the fourth result.

For example, the first latch D1, the second latch D2, and the third latch D3 are located in the page buffer of the peripheral circuit.

In some examples, an XOR operation is performed on the second result and the third result to obtain a fourth result. As shown in FIG. 10, the part in which the bit is 1 in the fourth result represents the number of memory cells with threshold voltages being different at the target read voltage V0 and the adjusted target read voltage V1; in other words, the part in which the bit is 1 in the fourth result represents the number of bits in the code word that are flipped in the two results of reading at the target read voltage V0 and the adjusted target read voltage V1. Since the single level read mode is employed, e.g., both of the two read operations described above are to read one bit of data stored in the lower page of the memory cell in the code word. The part in which the bit is 1 in the fourth result represents the number of memory cells in the code word that are flipped in the two results of reading at the target read voltage V0 and the adjusted target read voltage V1. The number is denoted as the first result Y1 corresponding to the target read voltage.

In some examples, the peripheral circuit is configured to: perform a second adjustment to the target read voltage to obtain a target adjusted read voltage when the first result corresponding to the target read voltage is less than or equal to the first preset value; the step size of the second adjustment is greater than the step size of the first adjustment; obtain a first result corresponding to the code word at the target adjusted read voltage.

In one example, as shown in FIG. 10, a second adjustment is performed to the target read voltage V0 to obtain the target adjusted read voltage V2, there is a second voltage difference $\Delta V2$ between the target read voltage V0 and the target adjusted read voltage V2, and the size of the two voltage differences is the step size of the second adjustment. The step size of the second adjustment is greater than the step size of the first adjustment, e.g., the second voltage difference $\Delta V2$ is greater than the first voltage difference $\Delta V1$.

The data stored in the lower page of the memory cell in the code word is read at the target adjusted read voltage V2, the memory cell with a threshold voltage being less than the target adjusted read voltage V2 after adjustment is labeled as bit 1, and the memory cell with a threshold voltage being greater than the target adjusted read voltage V2 is labeled as bit 0; a second result is obtained and stored in the first latch of the memory device.

A first adjustment is performed to the target adjusted read voltage V2, and the data stored in the code word is read at the target adjusted read voltage after adjustment (V3 shown in FIG. 10) to obtain a third result. In one example, the data stored in the lower page of the memory cell in the code word is read at the target adjusted read voltage after adjustment (V3 shown in FIG. 10), the memory cell with a threshold voltage being less than the target adjusted read voltage after adjustment (V3 shown in FIG. 10) is labeled as bit 1, the memory cell with a threshold voltage being greater than the target adjusted read voltage after adjustment (V3 shown in FIG. 10) is labeled as bit 0, a third result is obtained, and stored in a second latch of the memory device.

An XOR operation is performed on the second result and the third result to obtain a fourth result, and the fourth result is stored in the third latch of the memory device. In one example, as shown in FIG. 10, the part in which the bit is 1 in the fourth result represents the number of memory cells with threshold voltages being different at the target adjusted read voltage V2 and the target adjusted read voltage V3 after adjustment; in other words, the part in which the bit is 1 in the fourth result represents the number of bits in the code word that are flipped in the two results of reading at the target adjusted read voltage V2 and the target adjusted read voltage V3 after adjustment. Since the single level read mode is employed, e.g., both of the two read operations described above are to read one bit of data stored in the lower page of the memory cell in the code word, the part in which the bit is 1 in the fourth result represents the number of memory cells in the code word that are flipped in the two results of reading at the target adjusted read voltage V2 and the target adjusted read voltage V3 after adjustment, the number is denoted as the first result Y2 corresponding to the target adjusted read voltage V2.

In some examples, the peripheral circuit is configured to: when the first result corresponding to at least one of the code words at the target adjusted read voltage is less than the first preset value and greater than the second preset value, continue to perform a second adjustment to the target adjusted read voltage, and obtain a first result corresponding to the code word at the adjusted read voltage, until a first result corresponding to a final adjusted read voltage is less than or equal to the second preset value.

In some examples, the peripheral circuit is configured to: when the first result corresponding to the final adjusted read voltage is less than or equal to the second preset value, the read voltage corresponding to the smallest first result among the plurality of first results is to be the valley voltage.

In one example, referring to Table 1, the first result obtained in the first iteration is 200, which may be understood as the first result corresponding to the target read voltage V0. The first result obtained in the second iteration is 160, which may be understood as the first result corresponding to the target adjusted read voltage V2. A plurality of first results obtained from the third iteration to the seventh iteration are shown in Table 1.

In some examples, the peripheral circuit is configured to obtain the first preset value; the first preset value is equal to the upper limit of the fail bit count supported by the memory device.

It may be understood that the number of flipped bits is the fail bit count; and in other words, the first result being less than the first preset value is equivalent to the first result being less than the upper limit of the fail bit count supported by the memory device; thus, the first result may be used as one of a plurality of first results for determining the valley voltage.

In one example, the first preset value is set to 225, and the second preset value is set to 10. The read voltage corresponding to the smallest first result among the plurality of first results in Table 1 is to be the valley voltage, e.g., the read voltage corresponding to the first result obtained in the fourth iteration is to be the valley voltage.

It may be understood that the read voltage corresponding to the first result obtained in the fourth iteration is the valley voltage in the first-level read voltage L1 corresponding to the lower page shown in FIG. 8.

In some examples, the peripheral circuit is configured to: when the first result corresponding to the target read voltage is greater than the first preset value, perform multiple adjustments to the target read voltage, and obtain a plurality of first results respectively corresponding to at least one of the code words at the read voltages after multiple adjustments.

It should be noted that the direction and step size of the multiple adjustments to the target read voltage may be random, to randomly obtain a plurality of first results.

When the plurality of first results are all greater than the first preset value, the number of memory cells corresponding to the code word may be adjusted. The number of memory cells corresponding to the code word after adjustment is less than the number of memory cells corresponding to the code word before adjustment.

It may be understood that through reducing the number of memory cells corresponding to the code word, the total amount of data contained in the fourth result may be reduced, and the reduction of the total amount may reduce the number counted from the total amount to a certain extent, e.g., the first result will also decrease; therefore, it is easier for the first result to be within the range of the first preset value.

Figure 12:
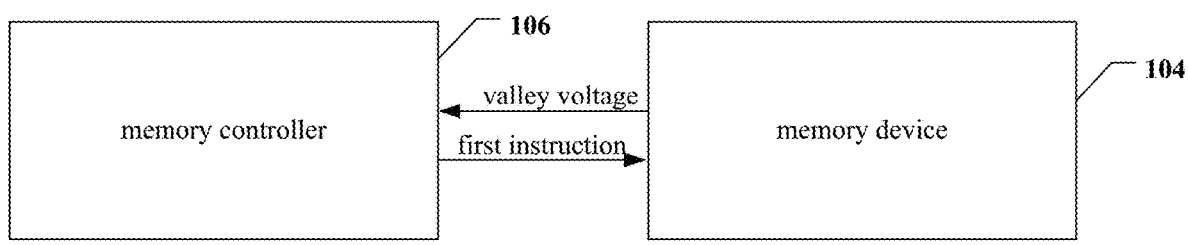
FIG. 12 is a block diagram of a memory system provided by an example of the present application.

An example of the present application provides a memory system, as shown in FIG. 12, the memory system 102 includes: one or more memory devices 104 as described in the above examples; and a memory controller 106 coupled to and controlling the memory device 104.

In some examples, the memory controller 106 is configured to: send a first instruction before performing a read operation on data stored in the memory device 104. The first instruction indicates to obtain the valley voltage; the memory device 104 is configured to: receive the first instruction, obtain a valley voltage, and send the obtained valley voltage to the memory controller 106; the memory controller 106 is further configured to: perform a read operation on data stored in the memory device 104 in accordance with the valley voltage; perform an error correction code decoding operation on the read result of the read operation.

In some examples, the error correction code decoding operation includes a hard-decoding operation with a Low Density Parity Check Code (LDPC).

Thus, the memory controller directly receives the valley voltage obtained from the memory device side, which reduces the time for data transmission between the memory controller and the memory device, and reserves sufficient time for subsequent error correction code decoding operations on the read results of the read operation. Furthermore, the memory controller directly performs a read operation and an error correction code decoding operation in accordance with the valley voltage, which shortens the overall operation time.

An example of the present application provides a method for operating a memory system.

The method may include sending a first instruction before performing a read operation on data stored in the memory device of the memory system. The first instruction indicates to obtain a valley voltage. The valley voltage is obtained according to the method of any one of the examples described above.

The method may include performing a read operation on data stored in the memory device in accordance with the valley voltage.

The method may include performing an error correction code decoding operation on the read result of the read operation.

Figure 13:
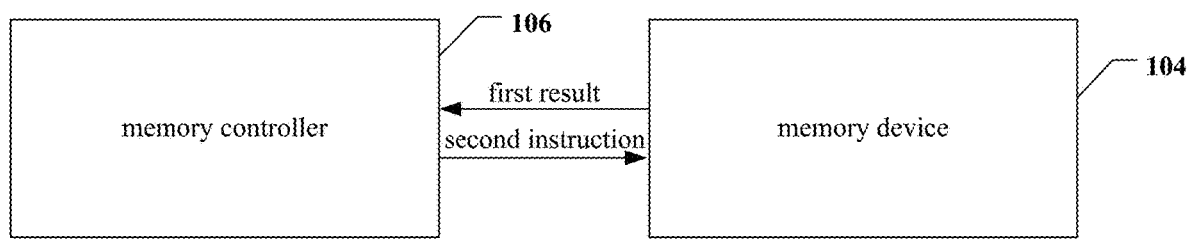
FIG. 13 is a block diagram of a memory system provided by another example of the present application.

Another example of the present application provides a memory system, as shown in FIG. 13. The memory system 102 may include at least one memory device 104, the memory device 104 may include a plurality of memory cells, a preset number of the memory cells may form a code word; a memory controller 106 coupled to the at least one memory device 104 and configured to: obtain a first result corresponding to at least one of the code words at a target read voltage; the first result includes the number of bits which represents the number of bits in at least one of the code words which are flipped in two results of reading at a first read voltage and a second read voltage; the difference between the first read voltage and the second read voltage is less than a preset voltage; adjust the target read voltage in accordance with the first result corresponding to at least one of the code words at the target read voltage; obtain the first result corresponding to at least one of the code words at the adjusted read voltage; determine a valley voltage in accordance with a plurality of the first results; the valley voltage is a read voltage for performing a read operation on at least one of the code words.

In some examples, the memory controller 106 is configured to: send a second instruction before performing a read operation on data stored in the memory device 104, the second instruction indicates to obtain a plurality of first results corresponding to at least one of the code words at multiple different read voltages.

The memory device 104 is configured to: receive the second instruction, obtain a plurality of first results corresponding to the code word at multiple different read voltages, and send the obtained first results to the memory controller.

The memory controller 106 is further configured to: determine a valley voltage in accordance with the plurality of first results respectively corresponding to multiple different read voltages; and perform a read operation on data stored in the memory device in accordance with the valley voltage.

In some examples, the memory device 104 is configured to: read data stored in the code word at the target read voltage to obtain a second result; perform a first adjustment to the target read voltage and read data stored in at least one of the code words at the target read voltage to obtain a third result; perform a logical operation on the second result and the third result to obtain a fourth result; count the number of bits in the fourth result that represent flip of bits in the third result relative to the second result to obtain a first result.

In some examples, the data amount of the first result is less than a preset threshold of data amount.

Figure 14:
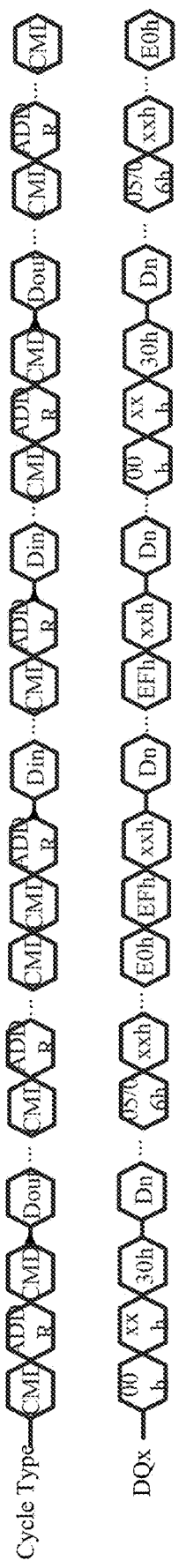
FIG. 14 is a timing diagram for performing an example read-retry operation provided by the present application.

FIG. 14 is an example timing diagram for performing a read-retry operation provided by the present application. DQx may be represented as a data bus signal, and Cycle Type may further represent the type of data bus signal.

As shown in FIG. 14, the read command may include, e.g., two subcommands (e.g., 00h and 30h), and in one example, the memory device transmits the address ADDR of the data to be read (e.g., two column addresses C1 to C2 and three row addresses R1 to R3) between received subcommands 00h and 30h. After the memory device receives the subcommand 30h, during the reading time, the corresponding data DATA (e.g., Dn) in the page of the receiving address may be buffered in the page buffer, and then the data DATA will be read on demand. It should be noted that in the example described above, data corresponding to a page needs to be frequently transmitted between the memory device and the memory controller when performing a read-retry operation, and it takes a long time to transmit the data.

Figure 15:
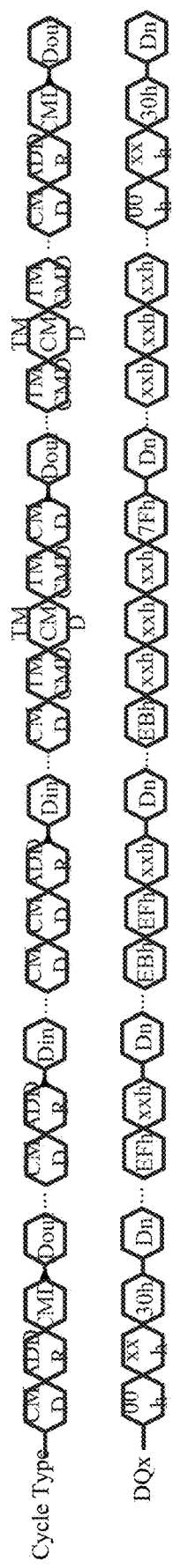
FIG. 15 is a timing diagram for determining the valley voltage and performing a read operation provided by an example of the present application.

FIG. 15 is a timing diagram for determining the valley voltage and performing a read operation provided by an example of the present application. As shown in FIG. 15, in addition to the conventional read command (e.g., the read command includes two subcommands (e.g., 00h and 30h)), the example of the present application also includes a second instruction, e.g., the second instruction includes the subcommands EBh and xxh. In an illustrated example, the memory device 104 transmits the address ADDR of the data to be read (e.g., two column addresses C1 to C2 and three row addresses R1 to R3) between received subcommands 00h and 30h. The memory device 104 receives subcommands EBh and xxh of the second instruction after receiving the subcommand 30h. As indicated by the second instruction, the memory device 104 obtains first results corresponding to the code word at the corresponding read voltages, and sends the obtained first results to the memory controller. The memory controller determines a valley voltage in accordance with the plurality of first results respectively corresponding to multiple different read voltages received from the memory device; and performs a read operation on data stored in the memory device in accordance with the valley voltage.

It should be noted that the second instruction provided in the example of the present application is only an example and should not unduly limit the claimed scope of the present application. In some examples, the data amount of the first result is less than the preset threshold of data amount, e.g., the data amount of the first result ranges from 1 byte to 4 byte; therefore, in the process of determining the valley voltage, the amount of data transferred between the memory device and the memory controller is small and the data is transferred at a fast speed, which is beneficial to improving the overall speed of the read operation.

Another example of the present application provides a method for operating a memory system, including: obtaining a first result corresponding to at least one of the code words at a target read voltage; the first result includes the number of bits which represents the number of bits in at least one of the code words which are flipped in two results of reading at a first read voltage and a second read voltage; the difference between the first read voltage and the second read voltage is less than a preset voltage; the memory system including at least one memory device, the memory device including a plurality of memory cells, a preset number of the memory cells forming a code word; adjusting the target read voltage in accordance with the first result corresponding to at least one of the code words at the target read voltage; obtaining the first result corresponding to at least one of the code words at the adjusted read voltage; determining a valley voltage in accordance with a plurality of the first results; the valley voltage is a read voltage for performing a read operation on at least one of the code words.

In some examples, the method further includes: sending a second instruction before performing a read operation on data stored in the memory device in the memory system, the second instruction indicating to obtain a plurality of first results corresponding to the code word at the multiple different read voltages; determining a valley voltage in accordance with the plurality of first results respectively corresponding to multiple different read voltages; and perform a read operation on data stored in the memory device in accordance with the valley voltage.

In some examples, the data amount of the first result is less than the preset threshold of data amount, e.g., the data amount of the first result ranges from 1 byte to 4 byte, therefore, in the process of determining the valley voltage, the amount of data transferred between the memory device and the memory controller is small and the data is transferred at a fast speed, which is beneficial to improving the overall speed of the read operation.

In some examples, the method further includes: reading data stored in the code word at the target read voltage to obtain a second result; performing a first adjustment to the target read voltage and read data stored in the code word at the adjusted target read voltage to obtain a third result; performing a logical operation on the second result and the third result to obtain a fourth result; counting the number of bits in the fourth result that represent flip of bits in the third result relative to the second result to obtain a first result.

In one example, XOR is performed on the second result and the third result to obtain the fourth result. Since a single level read mode is employed, e.g., the two read operations performed at the target read voltage and the adjusted target read voltage are both to read one bit of data stored in the lower page of the memory cell in the code word, therefore, the part in which the bit is 1 in the fourth result represents the number of bits or the number of memory cells in the code word that are flipped in the two results of reading at the target adjusted read voltage and the target adjusted read voltage after adjustment.

In one example, the first preset value is set to 225, and the second preset value is set to 10. The read voltage corresponding to the smallest first result among the plurality of first results in Table 1 is to be the valley voltage, e.g., the read voltage corresponding to the first result obtained in the fourth iteration is to be the valley voltage.

It may be understood that the read voltage corresponding to the first result obtained in the fourth iteration is to be the valley voltage in the first-level read voltage L1 corresponding to the lower page shown in FIG. 8.

It should be noted that the process of determining the valley voltage in read voltages at multiple levels corresponding to each type of page is similar to the method disclosed in the example described above, and will not be repeated here.

Another example of the present application provides a memory device, as shown in FIG. 5, the memory device includes: an array of memory cells 301, including a plurality of memory cells, a preset number of the memory cells forming a code word; peripheral circuit coupled to the array of memory cells 301, including control logic 512 and a page buffer 504; the control logic 512 is configured to: read data stored in at least one of the code words at a first read voltage to obtain a second result, and store the second result in the first latch of the page buffer; adjust the first read voltage to obtain a second read voltage, read data stored in the code word at the second read voltage to obtain a third result, and store the third result in the second latch of the page buffer; the difference between the first read voltage and the second read voltage is less than a preset voltage; perform a logical operation on the second result and the third result to obtain a fourth result, and store the fourth result in the third latch of the page buffer; count the number of bits in the fourth result that represent flip of bits in the third result relative to the second result to obtain a first result.

Another example of the present application provides a method for operating a memory device.

The method may include reading data stored in a code word at a first read voltage to obtain a second result, and storing the second result in a first latch of a page buffer; the memory device including an array of memory cells and a page buffer, the array of memory cells including a plurality of memory cells, a preset number of the memory cells forming a code word. The method may include adjusting the first read voltage to obtain a second read voltage, reading data stored in the code word at the second read voltage to obtain a third result, and storing the third result in the second latch of the page buffer; the difference between the first read voltage and the second read voltage is less than a preset voltage. The method may include performing a logical operation on the second result and the third result to obtain a fourth result, and storing the fourth result in the third latch of the page buffer. The method may include counting the number of bits in the fourth result that represent flip of bits in the third result relative to the second result to obtain a first result.

In this and the previous example, the difference between the first read voltage and the second read voltage being less than the preset voltage may be understood that there is a smaller voltage difference between the first read voltage and the second read voltage. In some examples, the range of the preset voltage is set to 6 mV to 21 mV; in some examples, the preset voltage may be 6 mV, 11 mV, 16 mV, and 21 mV. The first results all have the same referring meaning as the aforementioned first results means that they all include the number of bits which represents the number of bits in at least one of the code words flipped in two results of reading at a first read voltage and a second read voltage. It should be noted that the first result here, or the acquisition process for the FBC between the read voltages with two voltage differences being close may be packaged inside the memory device and accelerated through the page buffer in the memory device.

It should be noted that the concepts mentioned in this and the previous example that are the same as those in the examples described above may be understood with reference to the description in the examples described above, and will not be repeated here. In addition, in this and the previous example, the last obtained first result may also be used for many scenarios other than determining the valley voltage described above. For example, the scenario of determining the offset of a memory cell in a memory device.

Figure 16:
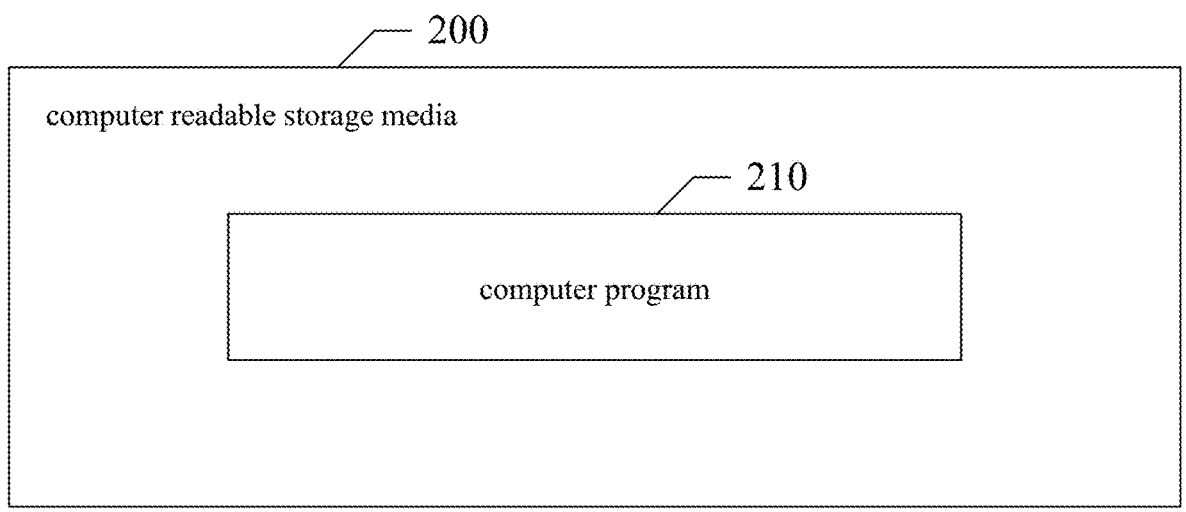
FIG. 16 is a block diagram of a computer readable storage medium provided by an example of the present application.

Referring to FIG. 16, a block diagram of a computer readable storage medium provided by an example of the present application is shown. As shown in FIG. 16, an example of the present disclosure provides a computer readable storage medium, the computer readable storage medium 200 stores computer program 210 that when executed by a processor may implement the method for operating a memory system of the technical schemes described above. The method includes: obtaining a first result corresponding to at least one of the code words at a target read voltage; the first result is to represent the number of bits in at least one of the code words which are flipped in two results of reading at a first read voltage and a second read voltage; the difference between the first read voltage and the second read voltage is less than a preset voltage; the memory system including at least one memory device, the memory device including a plurality of memory cells, a preset number of the memory cells forming a code word; adjusting the target read voltage in accordance with the first result corresponding to at least one of the code words at the target read voltage; obtaining the first result corresponding to at least one of the code words at the adjusted read voltage; determining a valley voltage in accordance with a plurality of the first results; the valley voltage is a read voltage for performing a read operation on at least one of the code words.

It should be understood that reference throughout the description to "one example" or "an example" means that a particular feature, structure or characteristic related to the example is included in at least one example of the present application. Thus, appearances of "in one example" or "in an example" in various places throughout the description are not necessarily referring to a same example. Furthermore, these particular features, structures or characteristics may be combined in any appropriate manner in one or more examples. It should be understood that in various examples of the present application, sequence numbers of the processes described above do not mean the performing order, and the performing order of each process should be determined by its function and internal logic, and should not constitute any limitation to implementation process of examples of the present application. The serial numbers of examples of the present application described above are for the purpose of description only, and do not represent the advantages and disadvantages of the examples.

The above is only a preferred example of the present application, and does not limit the patent scope of the present application, and under the inventive concept of the present application, any equivalent structural transformation made by using content of the present application and the accompanying drawings, or direct/indirect application in other related technical fields are included in the patent protection scope of the present application.

The memory device and operating method thereof, the memory system and operating method thereof provided by the examples of the present application are able to effectively avoid the problems of long time consumption and incomplete scene coverage caused by using the retry table, and to save the space occupied by the retry table, find the valley voltage more quickly and accurately, thereby effectively reducing the time delay in determining the valley voltage. Meanwhile performing read operations at the obtained valley voltage greatly increases the probability of correctly reading the storage data, thus improving product reliability and user experience.

What is claimed is:

1. A memory device, comprising:
an array of memory cells, including a plurality of memory cells, wherein a preset number of the plurality of memory cells form a code word;
a peripheral circuit coupled to the array of memory cells and configured to:
obtain a first result corresponding to at least one of the code words at a target read voltage, wherein the first result includes a number of bits which represents the number of bits in at least one of the code words which are flipped in two results of reading at a first read voltage and a second read voltage, and wherein a difference between the first read voltage and the second read voltage is less than a preset voltage;
adjust the target read voltage in accordance with the first result corresponding to at least one of the code words at the target read voltage;
obtain a first result corresponding to at least one of the code words at the adjusted read voltage; and
determine a valley voltage in accordance with a plurality of the first results, wherein the valley voltage is a read voltage for performing a read operation on at least one of the code words.

2. The memory device of claim 1, wherein the peripheral circuit is configured to:
read data stored in at least one of the code words at the target read voltage to obtain a second result;
perform a first adjustment to the target read voltage, and read data stored in at least one of the code words at the adjusted target read voltage to obtain a third result;
perform a logical operation on the second result and the third result to obtain a fourth result; and
count the number of bits in the fourth result that represent flip of bits in the third result relative to the second result to obtain a first result.

3. The memory device of claim 2, wherein the peripheral circuit comprises:
a first latch configured to store the second result;
a second latch configured to store the third result; and
a third latch configured to store the fourth result.

4. The memory device of claim 2, wherein the peripheral circuit is configured to:
when the first result corresponding to the target read voltage is less than or equal to a first preset value, perform a second adjustment to the target read voltage to obtain a target adjusted read voltage, wherein a step size of the second adjustment is greater than a step size of the first adjustment; and
obtain a first result corresponding to at least one of the code words at the target adjusted read voltage.

5. The memory device of claim 4, wherein the peripheral circuit is configured to:
when the first result corresponding to at least one of the code words at the target adjusted read voltage is less than the first preset value and greater than a second preset value, continue to perform a second adjustment to the target adjusted read voltage, and obtain a first result corresponding to at least one of the code words at the adjusted read voltage, until a first result corresponding to a final adjusted read voltage is less than or equal to the second preset value; and
when the first result corresponding to the final adjusted read voltage is less than or equal to the second preset value, take the read voltage corresponding to the first result with the smallest count number among the first results as the valley voltage.

6. The memory device of claim 2, wherein the peripheral circuit is configured to:
when the first result corresponding to the target read voltage is greater than a first preset value, perform multiple adjustments to the target read voltage, and obtain a plurality of first results respectively corresponding to at least one of the code words at the read voltages after multiple adjustments; and
when the plurality of first results are all greater than the first preset value, adjust the number of memory cells corresponding to at least one of the code words, wherein the number of memory cells corresponding to the code word after adjustment is less than the number of memory cells corresponding to the code word before adjustment.

7. The memory device of claim 4, wherein the peripheral circuit is configured to:
obtain the first preset value, wherein the first preset value is equal to an upper limit of fail bit count supported by the memory device.

8. The memory device of claim 1, wherein the peripheral circuit is configured to:
set a read mode of the memory device to a single level read mode before obtaining the first result corresponding to at least one of the code words at the target read voltage, wherein the single level read mode includes reading at least one bit of storage data stored in the memory cell with read voltages at one level.

9. The memory device of claim 8, wherein:
the memory cell includes M bits, the memory device includes M-type pages, and the memory cell with M bits reads its M bits of storage data with read voltages at N levels;
the M and N are both integers greater than 1, and $N=2^M-1$; and
the peripheral circuit is configured to:
for read voltages at each level of the read voltages at multiple levels corresponding to each type of page, determine the valley voltage at each level in accordance with a plurality of first results corresponding to multiple read voltages at each level.

10. A memory system, comprising:
one or more memory device, comprising:
an array of memory cells, including a plurality of memory cells, wherein a preset number of the plurality memory cells form a code word;
a peripheral circuit coupled to the array of memory cells and configured to:
obtain a first result corresponding to at least one of the code words at a target read voltage, wherein the first result includes the number of bits which represents the number of bits in at least one of the code words which are flipped in two results of reading at a first read voltage and a second read voltage, and wherein a difference between the first read voltage and the second read voltage is less than a preset voltage;

adjust the target read voltage in accordance with the first result corresponding to at least one of the code words at the target read voltage;
obtain a first result corresponding to at least one of the code words at the adjusted read voltage; and
determine a valley voltage in accordance with a plurality of the first results, wherein the valley voltage is a read voltage for performing a read operation on at least one of the code words; and
a memory controller coupled to the memory device and controlling the memory device.

11. The memory system of claim 10, wherein:
the memory controller is configured to:
send a first instruction before performing a read operation on data stored in the memory device, wherein the first instruction indicates to obtain the valley voltage;
the memory device is configured to:
receive the first instruction;
obtain the valley voltage; and
send the obtained valley voltage to the memory controller; and
the memory controller is further configured to:
perform a read operation on data stored in the memory device in accordance with the valley voltage; and
perform an error correction code decoding operation on a read result of the read operation.

12. A method for operating a memory device, comprising:
obtaining a first result corresponding to at least one of code words at a target read voltage, wherein the first result includes a number of bits which represents the number of bits in at least one of the code words which are flipped in two results of reading at a first read voltage and a second read voltage, wherein a difference between the first read voltage and the second read voltage is less than a preset voltage, and wherein the memory device includes an array of memory cells, the array of memory cells includes a plurality of memory cells, and a preset number of the plurality memory cells form a code word;
adjusting the target read voltage in accordance with the first result corresponding to at least one of the code words at the target read voltage;
obtaining a first result corresponding to at least one of the code words at the adjusted read voltage; and
determining a valley voltage in accordance with a plurality of the first results, wherein the valley voltage is a read voltage for performing a read operation on at least one of the code words.

13. The method of claim 12, wherein the obtaining the first result corresponding to at least one of code words at the target read voltage comprises:
reading data stored in at least one of the code words at the target read voltage to obtain a second result;
performing a first adjustment to the target read voltage, and reading data stored in at least one of the code words at the adjusted target read voltage to obtain a third result;
performing a logical operation on the second result and the third result to obtain a fourth result; and
counting the number of bits in the fourth result that represent flip of bits in the third result relative to the second result to obtain a first result.

14. The method of claim 13, further comprising:
storing the second result in a first latch of the memory device;
storing the third result in a second latch of the memory device; and
storing the fourth result in a third latch of the memory device.

15. The method of claim 13, wherein the adjusting the target read voltage in accordance with the first result corresponding to at least one of the code words at the target read voltage comprises:
performing a second adjustment to the target read voltage to obtain a target adjusted read voltage when the first result corresponding to the target read voltage is less than or equal to a first preset value, wherein a step size of the second adjustment is greater than a step size of the first adjustment; and
obtaining a first result corresponding to at least one of the code words at the target adjusted read voltage.

16. The method of claim 15, further comprising:
when the first result corresponding to at least one of the code words at the target adjusted read voltage is less than the first preset value and greater than a second preset value, continuing to perform a second adjustment to the target adjusted read voltage, and obtaining a first result corresponding to at least one of the code words at the adjusted read voltage, until a first result corresponding to a final adjusted read voltage is less than or equal to the second preset value;
wherein the determining the valley voltage in accordance with the plurality of the first results comprises:
when the first result corresponding to the final adjusted read voltage is less than or equal to the second preset value, taking the read voltage corresponding to the smallest first result among the first results as the valley voltage.

17. The method of claim 12, further comprising:
when the first result corresponding to the target read voltage is greater than a first preset value, performing multiple adjustments to the target read voltage, and obtaining a plurality of first results respectively corresponding to at least one of the code words at the read voltages after multiple adjustments; and
when the plurality of first results are all greater than the first preset value, adjusting the number of memory cells corresponding to at least one of the code words, wherein the number of memory cells corresponding to the code word after adjustment is less than the number of memory cells corresponding to the code word before adjustment.

18. The method of claim 15, further comprising:
obtaining the first preset value, wherein the first preset value is equal to an upper limit of fail bit count supported by the memory device.

19. The method of claim 14, further comprising:
setting a read mode of the memory device to a single level read mode before obtaining the first result corresponding to at least one of the code words at the target read voltage, wherein the single level read mode includes reading at least one bit of storage data stored in the memory cell with read voltages at one level.

20. The method of claim 19, wherein:
the memory cell includes M bits, the memory device includes M-type pages, and the memory cell with M bits reads its M bits of storage data with read voltages at N levels;
the M and N are both integers greater than 1, and $N=2^M-1$; and the method further comprising:
for read voltages at each level of the read voltages at multiple levels corresponding to each type of page, determining the valley voltage at each level in accordance with a plurality of first results corresponding to multiple read voltages at each level.

* * * * *